(12) United States Patent
Kainuma et al.

(10) Patent No.: US 6,950,743 B2
(45) Date of Patent: Sep. 27, 2005

(54) NAVIGATION SYSTEM AND PROGRAM FOR NAVIGATION SYSTEM SETUP

(75) Inventors: Mamoru Kainuma, Aichi (JP); Masato Kobayashi, Aichi (JP); Arihiro Umeda, Aichi (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 10/395,879

(22) Filed: Mar. 25, 2003

(65) Prior Publication Data

US 2004/0039523 A1 Feb. 26, 2004

(30) Foreign Application Priority Data

Mar. 25, 2002 (JP) ........................................ 2002-084284
Apr. 25, 2002 (JP) ........................................ 2002-124357

(51) Int. Cl.⁷ .............................................. G01C 21/00
(52) U.S. Cl. ....................... 701/208; 701/206; 701/211; 701/212; 340/995.1; 340/995.14; 340/995.15; 340/995.17; 340/995.2
(58) Field of Search ................................. 701/206, 208, 701/211, 212; 340/995.1, 995.14, 995.15, 995.17, 995.2

(56) References Cited

U.S. PATENT DOCUMENTS

| | | | | |
|---|---|---|---|---|
| 5,229,947 A | * | 7/1993 | Ross et al. ................... | 701/200 |
| 5,414,629 A | * | 5/1995 | Inoue ......................... | 701/210 |
| 5,583,494 A | * | 12/1996 | Mizutani et al. ............ | 340/995.14 |
| 5,613,055 A | * | 3/1997 | Shimoura et al. ........... | 345/473 |
| 5,790,973 A | * | 8/1998 | Blaker et al. ............. | 455/456.5 |
| 6,119,066 A | * | 9/2000 | Sugiura et al. ............. | 701/208 |
| 6,121,900 A | * | 9/2000 | Takishita ................ | 340/995.11 |
| 6,128,571 A | * | 10/2000 | Ito et al. ..................... | 701/201 |
| 6,202,026 B1 | * | 3/2001 | Nimura et al. .............. | 701/211 |
| 6,434,482 B1 | * | 8/2002 | Oshida et al. .............. | 701/209 |
| 6,542,814 B2 | * | 4/2003 | Polidi et al. ................ | 701/208 |
| 2001/0041962 A1 | * | 11/2001 | Sugawara et al. .......... | 701/211 |

FOREIGN PATENT DOCUMENTS

| | | | | |
|---|---|---|---|---|
| EP | 1063493 A2 | * | 12/2000 | ........... G01C/21/36 |
| JP | 10039749 A | * | 2/1998 | ........... G09B/29/00 |
| JP | 2000-88593 | | 3/2000 | |
| JP | 2000-304560 | | 11/2000 | |
| JP | 2000-337909 | | 12/2000 | |

\* cited by examiner

*Primary Examiner*—Michael J. Zanelli
*Assistant Examiner*—Eric M. Gibson
(74) *Attorney, Agent, or Firm*—Lorusso & Loud

(57) ABSTRACT

In order to simplify the setting of interchanges for getting on and off, a navigation system has an information retrieval processing unit for obtaining map data and interchanges for getting on and off, a display unit which displays a setup screen for displaying a map including the interchanges for getting on and off and, on the same screen, a simple road chart including neighboring interchanges for getting on and off. When the map is scrolled, the simple road chart is renewed so as to correspond to the area to which the map is scrolled, and the setting of the interchanges for getting on and off is simplified.

14 Claims, 22 Drawing Sheets

FIG.23

| A | PREFECTUAL ROAD AND ABOVE |
|---|---|
| B | AVERAGE ROAD LENGTH BETWEEN TRAFFIC LIGHTS 1000m AND MORE |
| C | AVERAGE ROAD LENGTH BETWEEN INTERSECTIONS 150m AND MORE |
| D | UP AND DOWN LINE SEPARATED ROAD OR SINGLE ROAD WITH CENTRAL RESERVATION |
| E | AVERAGE NUMBER OF LANES AT ONE SIDE 1.5 AND MORE |
| F | ELEVATED ROAD CONTINUING 2km AND MORE |
| G | NO INTERSECTIONS BETWEEN IC SHAPES |
| H | CAR EXCLUSIVE USE ROAD |

FIG.24

|   | L50 | L10 | L11 | L12 | L13 | L14 | L15 | L16 | L17 | L18 | L19 |
|---|-----|-----|-----|-----|-----|-----|-----|-----|-----|-----|-----|
| A | ×   | ○   | ○   | ○   | ○   | ○   | ○   | ○   | ○   | ○   | ○   |
| B | ×   | ○   | ×   | ○   | ×   | ×   | ×   | ×   | ○   | ×   | ×   |
| C | ○   | ○   | ×   | ○   | ×   | ×   | ×   | ×   | ○   | ○   | ○   |
| D | ○   | ○   | ○   | ○   | ○   | ○   | ×   | ×   | ×   | ×   | ×   |
| E | ×   | ×   | ×   | ×   | ×   | ×   | ×   | ○   | ○   | ○   | ○   |
| A&B&C&D | × | ○ | × | ○ | × | × | × | × | × | × | × |
| A&B&C&E | × | × | × | × | × | × | × | × | ○ | × | × |

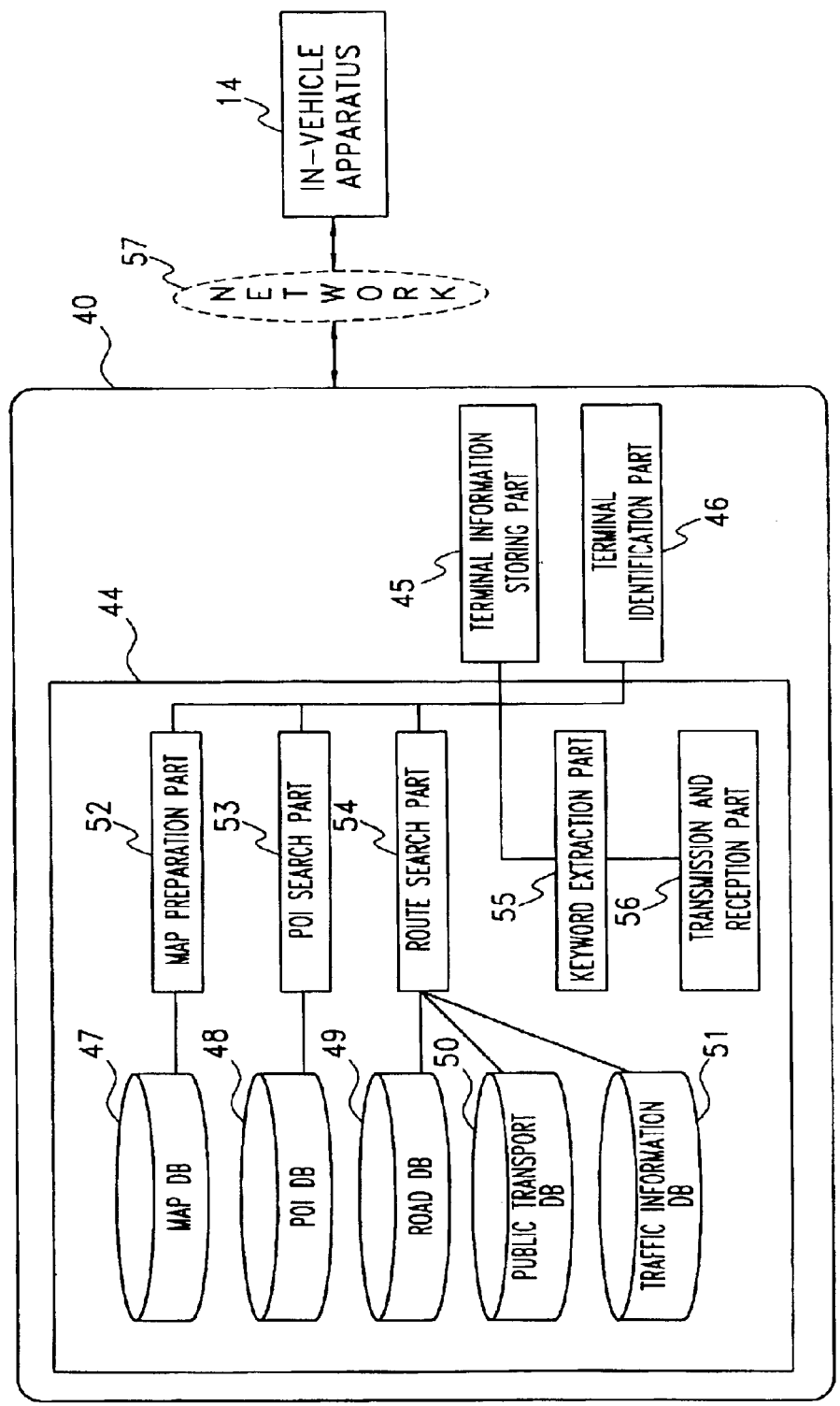

NAVIGATION SYSTEM AND PROGRAM FOR NAVIGATION SYSTEM SETUP

BACKGROUND OF THE INVENTION

1. Field of the Invention

This invention relates to a navigation system and to a program for a navigation system setup method.

2. Description of the Related Art

In a conventional navigation apparatus the current location of the vehicle as detected by GPS (Global Positioning System), the angle of the vehicle which as detected by a gyro sensor, the direction of the vehicle, and a map of the vicinity of the current location are displayed on a map screen. Therefore, an operator, e.g., a driver, can run the vehicle in accordance with the current location and the direction of the vehicle which are displayed on the map screen.

Conventionally the driver can set a destination and, when the destination is set, a route from a place of departure or current location to the destination is searched by route search processing, and a route determined by the route search, i.e., the "searched route", is displayed on a search route display screen. Accordingly, the driver can drive his/her vehicle along the searched route with guidance.

When expressways and toll roads connecting interchanges are included in the route from the place of departure to the destination determined by the route search processing, interchanges for entering the expressways and toll roads from open roads, i.e., entrance ramps, and exit interchanges, are searched in addition to the route. Next to the search route display screen is provided a setup screen showing interchanges for entering and exiting the toll roads and searched interchanges for getting on and off are displayed as defaults.

FIG. 2 shows one example of an interchange setup screen in a conventional navigation apparatus. Here an expressway is shown by way of example.

In the figure, AR1 is an area for indicating the interchange (IC) to get on, and AR2 is an area for indicating the interchange (IC) to get off, and AR3 is an area for indicating the searched interchange to get on or the searched interchange to get off, and hw1 to hw3 are expressways which connect to the interchanges indicated in the area AR3, and AR4 to AR6 are areas for indicating the interchanges of each expressway hw1 to hw3.

Adjacent to each area AR4 to AR6, keys k1 to k3 are displayed, and each time the keys k1 to k3 are depressed (or touched), the interchanges on each of expressways hw1 to hw3 are changed cyclically. For example, each time the key k1 is depressed, several interchanges short of the interchange displayed in the area AR3 in the direction of travel are cyclically displayed in the area AR4.

Firstly, the searched interchanges for getting on are displayed in the areas AR1 and AR3 as a default, and the searched interchange for getting off is displayed in the area AR2 as a default, and interchanges neighboring the interchange displayed in the area AR3 are displayed as defaults in the areas AR4 to AR6. An operator, e.g., a driver, selects a specific interchange by depressing one of the keys k1 to k3 and, subsequently, when the area in which the selected interchange was displayed is depressed (or touched), the selected interchange is designated as the interchange for getting on, and displayed in the area AR1.

Next, in the area AR3, as shown in the figure, the searched interchange for getting offs displayed as the default and, in the areas AR4 to AR6, the interchanges neighboring the interchange displayed in the area AR3 are displayed as defaults. The driver, by depressing one of the keys k1 to k3, selects a the specific interchange, and subsequently, when the area in which the selected interchange was displayed is depressed (or touched), the selected interchange is designated as the interchange for getting off, and displayed in the area AR2. In this manner, the interchanges for getting on and off are set and decided.

However, in the above-described conventional navigation apparatus, since the searched interchanges for getting on and off are displayed as defaults on the interchange setup screen, and the interchanges neighboring the interchanges for getting on and off are simply displayed as defaults, the driver can not see the entire route, and therefore it is difficult to recognize the relationship between positions of the place of departure and the destination and the interchanges for getting on and off and it is impossible to set appropriate interchanges for getting on and off according to the place of departure and the destination.

SUMMARY OF THE INVENTION

In the present invention a map and interchanges are displayed on the interchange setup screen, and when the driver selects the interchanges on the map, the selected interchanges can be set as the designated interchanges for getting on and off.

This invention aims to provide a navigation system and a program for a navigation system setup method which solve the problems of the conventional navigation apparatus, and which simplify the work of setting the interchanges for getting on and off.

Accordingly, the navigation system of the present invention has an information obtaining processing unit adapted to obtain map data and data for interchanges for getting on and off, a display section, and a setup screen display processing unit adapted to display, on the display section, a map that contains interchanges for getting on and off and, on the same screen, a simple road chart which contains neighboring interchanges for getting on and off, both of which are formed based upon the map data.

The setup screen display processing unit renews the simple road chart so as to correspond to the new map area, as the map is scrolled.

In another aspect of the navigation system of the invention, when the simple road chart is scrolled, by the setup screen display processing unit, the simple road chart is renewed and, concurrently, the map is renewed so as to correspond to the simple road chart.

In still another aspect of the navigation system of the invention, the setup screen display processing unit displays the neighboring interchanges for getting on and off side-by-side, in the simple road chart.

In still another aspect of the navigation system of the present invention, the setup screen display processing unit displays the interchanges for getting on and off which are the closest to the center of the map, at a fixed place in the simple road chart.

In still another aspect of the navigation system of the invention, the information obtaining processing unit also obtains service (amenity) stop data and, includes a service stop setup processing section adapted to set service stop locations, based upon the service stop data.

In still another aspect of the navigation system of the invention, the service setup processing unit forms a service stop setup screen on the display unit, and displays the simple road chart including neighboring facilities.

In still another aspect of the navigation system of the invention, the service stop setup processing unit renews the simple road chart so as to correspond to the map, when the map is scrolled.

In still another aspect of the navigation system of the invention, when the simple road chart is scrolled, by operation of the service stop setup processing unit the simple road chart is renewed and, concurrently, the map is renewed so as to correspond to the simple road chart.

In still another aspect of the navigation system of the invention, the service setup processing unit has a facility narrowing setup processing section adapted to set a selection narrowing condition.

In execution of a program for a navigation system setup method according to the invention, a computer functions as an information obtaining processing unit, for obtaining map data and data for interchanges for getting on and off, and as a setup screen display processing unit, for displaying on a display unit a map that contains the interchanges for getting on and off and a simple road chart that contains neighboring interchanges for getting on and off, both which are composed based upon the map data.

The setup screen display processing unit renews the simple road chart so as to correspond to the map, when the map has been scrolled.

BRIEF DESCRIPTION OF THE DRAWINGS

FIG. 23 is a list of questions (conditions) for generating rapid road information in an embodiment of the invention;

FIG. 24 is a table showing determinations responsive to the questions of FIG. 23;

FIG. 27 is a block diagram of the navigation system in another embodiment of the invention.

DESCRIPTION OF THE PREFERRED EMBODIMENTS

Hereinafter, preferred embodiments of the invention will be described in detail with reference to the drawings.

Figure 1:
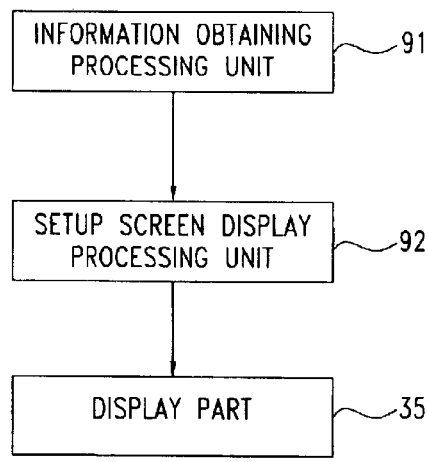
FIG. 1 is a block diagram of a navigation system according to a first embodiment of the invention.
Figure 2:
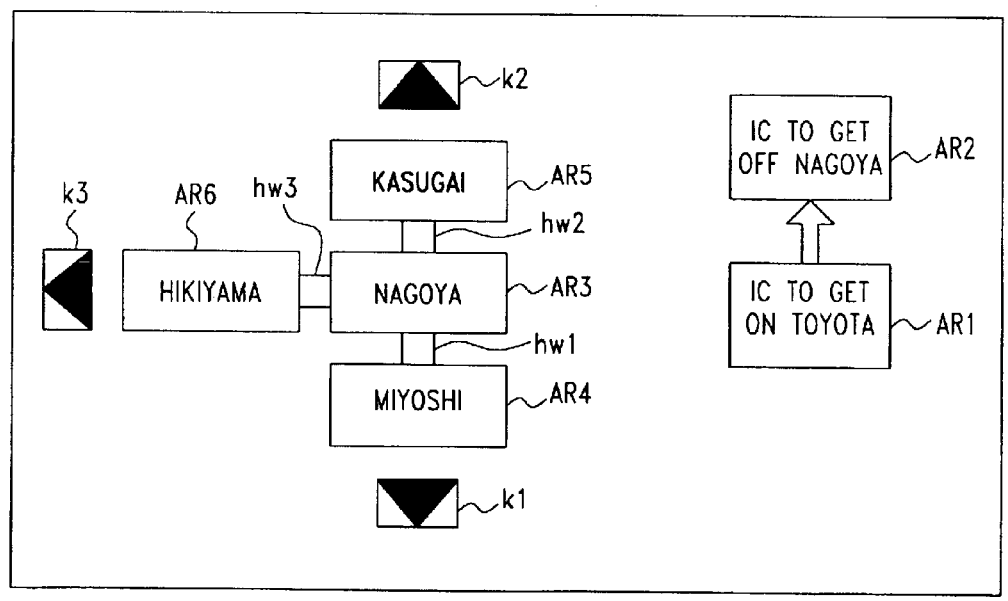
FIG. 2 shows a first example of an interchange screen in a conventional navigation apparatus.

FIG. 1 is a functional block diagram of a navigation system according to a first embodiment of the present invention.

In FIG. 1, 91 designates an information obtaining processing unit adapted to obtain map data and data of interchanges for getting on and off, 35 designates a display unit, and 92 designates a setup screen display processing unit adapted to display, on the display unit 35, a map which contains interchanges for getting on and off and a simple road chart which contains neighboring interchanges for getting on and off, both which are formed on the same screen based upon the map data.

The setup screen display processing unit 92, when the map is scrolled, renews the simple road chart so as to correspond to the map.

Figure 3:
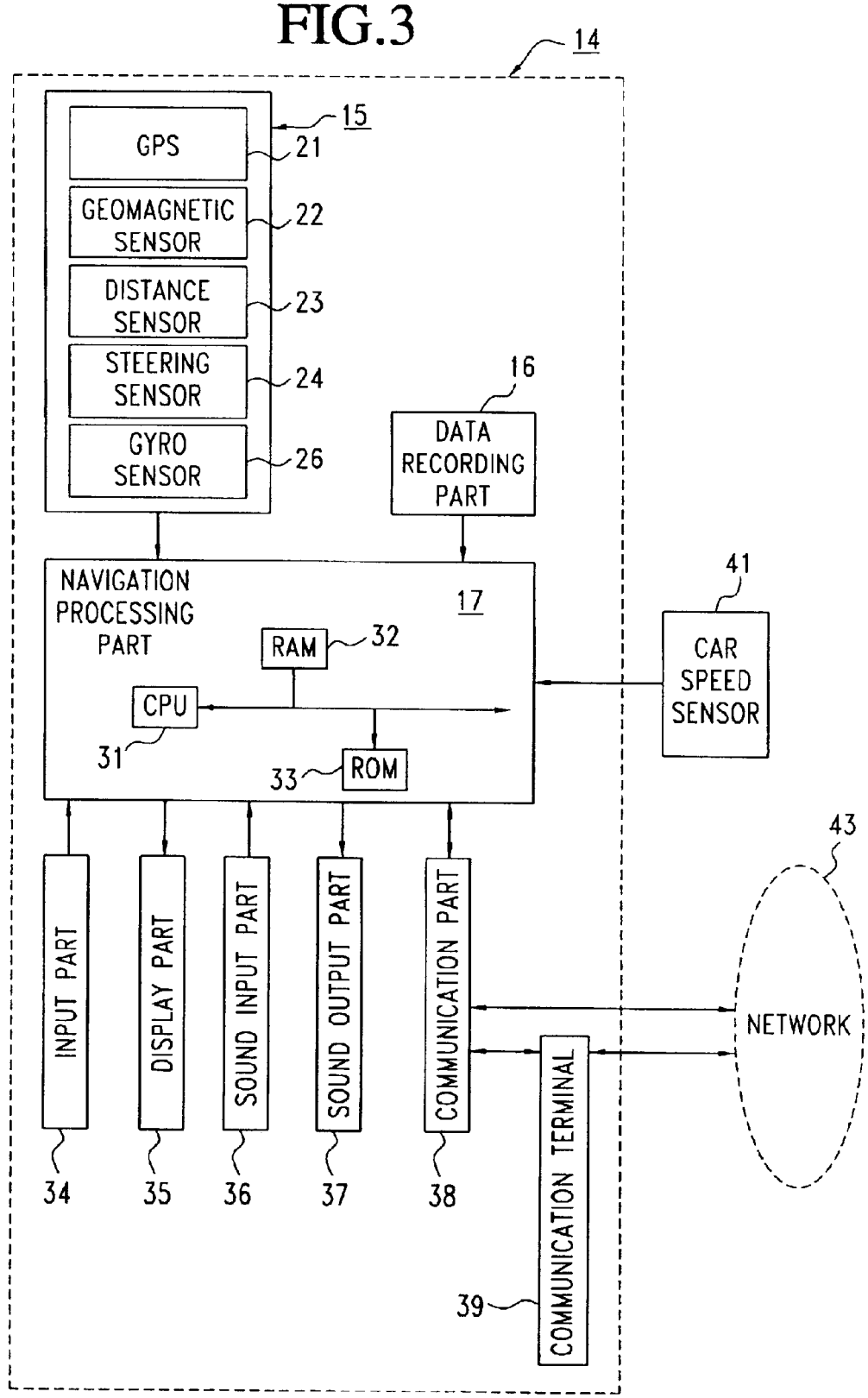
FIG. 3 is a block diagram of a first section of a first embodiment of the navigation system of the invention.
Figure 4:
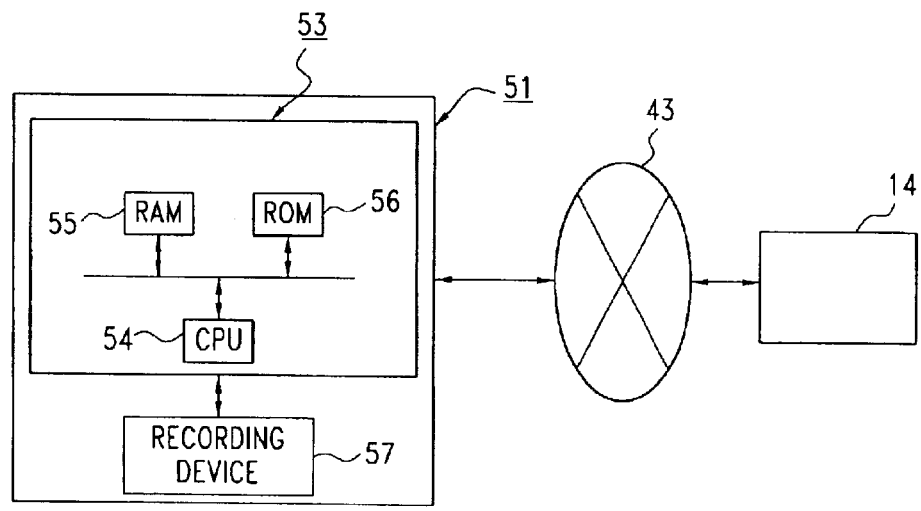
FIG. 4 is a block diagram of a second section of the first embodiment of the invention.
Figure 14:
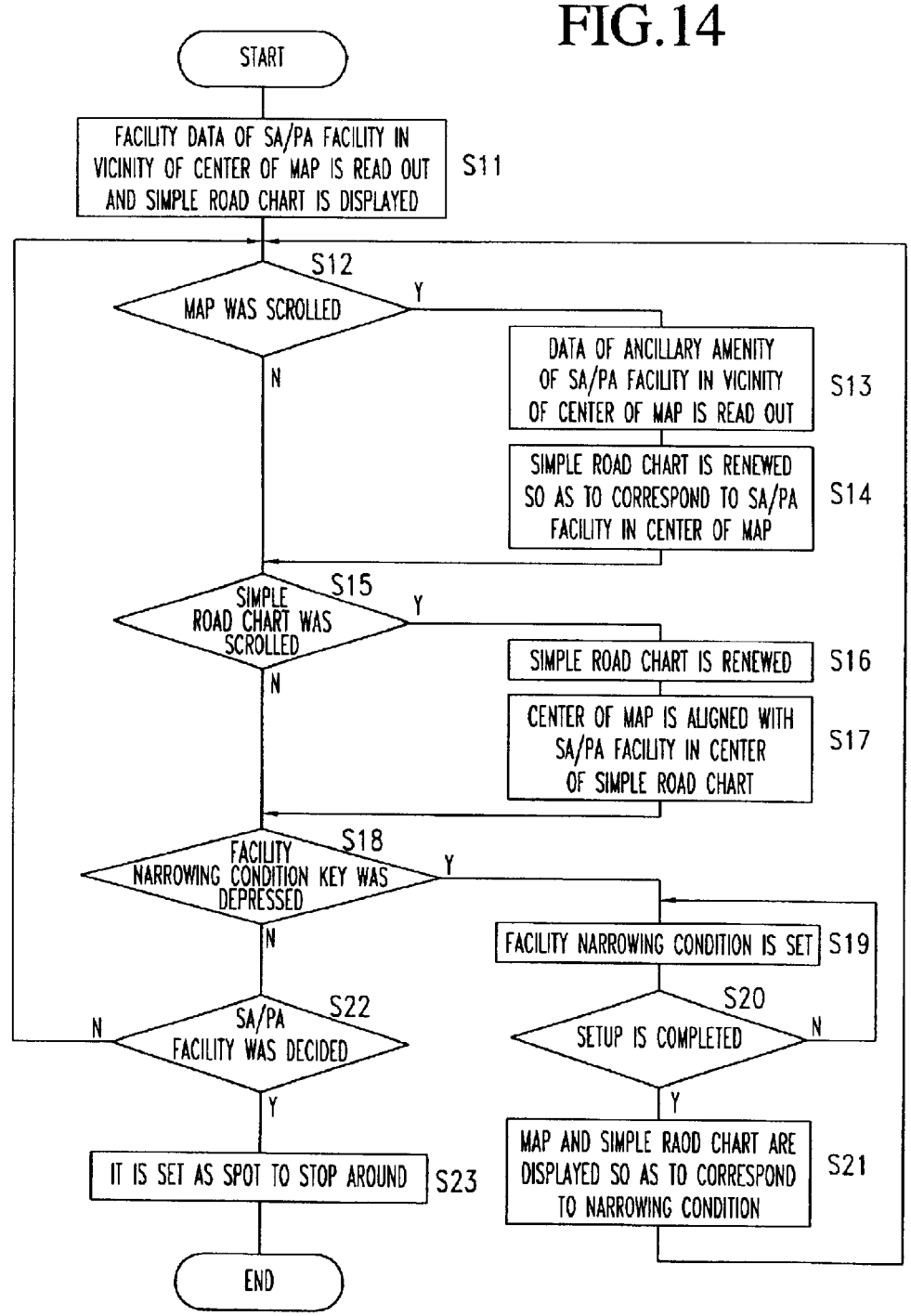
FIG. 14 is a flow chart of a service stop setup routine in a second embodiment of the invention.

Referring now to FIGS. 3 and 4, 14 designates a navigation apparatus as an in-vehicle apparatus which is mounted in a vehicle, and the navigation apparatus 14 is shown as including a current location detection processing unit 15 for detecting a current location etc., a data recording unit (or information recording unit) 16 in which navigation information such as map data, road data and search data are recorded, a navigation processing unit 17 which is a computer utilizing various programs, data etc., for executing various calculation routines such as navigation processing, based upon input information. An input unit 34 functions as an operation system and as a first input device, display unit 35 serves as a first output device, a sound input unit 36 serves as a second input device, a sound output unit 37 serves as a second output device, and a communication unit 38 serves as a third input device and a third output device. A communication terminal 39 and a car speed sensor 41 are connected to the navigation processing unit 17, and a network 43 is connected to the communication unit 38 and to a terminal having a communication function, i.e., the communication terminal 39. A communication unit is formed of the communication section 38 and the communication terminal 39.

The current location detection processing unit 15 comprises GPS 21 as a current location detector, a geomagnetic sensor 22, a distance sensor 23, a steering sensor 24, a gyro sensor 26 as a direction detector, and a not-shown altimeter, etc. Some of these devices can be properly omitted in the interest of reducing manufacturing cost, etc.

The GPS 21 detects current location by receiving electromagnetic signals from an artificial satellite, the geomagnetic sensor 22 detects direction of the vehicle by measuring earth magnetism, and the distance sensor 23 detects a distance, etc., between specific positions on a road. The distance sensor 23, for example, may be one which measures rotational speed of a wheel and determines a distance based upon the detected rotational speed, one which measures acceleration and determines a distance by integrating the measured acceleration twice, or other conventional device.

The steering sensor 24 detects rudder angle, and as the steering sensor 24, an optical sensor which is fixed to a rotational part of a steering wheel, a rotation resistance sensor, an angular sensor which is fixed to a wheel, etc., may be used.

The gyro sensor 26 detects a traverse angle, and as the gyro sensor 26, for example, a gas rate gyro, a vibration gyro, etc., may be used. Also, by integrating the traverse angle which as detected by the gyro sensor 26, the direction of the vehicle can be determined.

In addition, the GPS 21 can detect the current location independently. By combining the distance detected by the distance sensor 23, the direction of the vehicle which is detected by the geomagnetic sensor 22, or the traverse angle which is detected by the gyro sensor 26, the current location can be determined. The present location can also be determined by combining the distance detected by the distance sensor 23 and the rudder angle detected by the steering sensor 24.

The data recording unit 16 contains a database which comprises data files such as a map data file, an intersection data file, a node data file, a road data file, a photograph data file, a search data file, a specific facility information data file, a route data file, and a facility data file. In each data file are recorded various items of data for use in composing a screen to be presented on the display 35, i.e., for displaying a guide map of a searched route, displaying a photograph or a frame view peculiar to an intersection or a route, displaying distance to the next intersection, indicating travel direction at the next intersection, etc., and displaying other guidance information.

For example, in the intersection data file, intersection data relating to each intersection is recorded, and in the node data file, node data relating to node points is recorded, in the road data file, road data relating to roads is recorded, in the search data file, search data for searching routes is recorded, respectively. Utilizing the intersection data, the node data, the road data, the search data etc., road situation data indicating road situations is configured. In addition, the node data comprises data showing branch points, including intersections, T-shaped intersections, etc., of actual roads, the node points, links between the road points for connecting the node points, etc.

The road data indicate road width, slope, cant, bank, nature of the road surface, the number of lanes of the road, point where the number of lanes decreases, point where the road width decreases, etc., for each road segment. Road attribute data includes data for radius of curvature, intersections, T-junctions, start of turning a corner, etc., and a descending slope, an ascending slope, etc. Road classification data serves to identify a road segment of a searched route as open road such as a federal road, a state road, a narrow street, an expressway or a toll road. Further, utilizing the road data, a railroad crossing, a service road (ramp way) for entrance and exit of an expressway, a toll booth, and toll roads, etc., may be displayed.

The specific facility information data file contains information for specific facilities such as hotels, gas stations, parking lots, and scenic spots in each area. In addition, in the data recording section 16, are recorded various data items for the outputting of specific information by the sound output section 37.

The navigation processor 17 comprises CPU 31 for overall control of the in-vehicle apparatus 14, RAM 32 as a first memory medium which is used as a working memory when the CPU 31 executes various calculation routines, and ROM 33 as a second memory medium in which, in addition to control programs, are recorded various programs for carrying out a search of routes to the destination, for guiding travel en route, for deciding a specific zone, for search for a spot, a facility, etc., and so on. The navigation processor 17 is connected to the input unit 34, to the display 35, to the sound input unit 36, to the sound output unit 37, to the communication unit 38 and to the communication terminal 39. One or more of the sound input unit 36, the sound output unit 37 and the communication unit 38 can be omitted in the interest of reducing manufacturing cost, etc.

In addition to RAM 32, ROM 33, etc., a semiconductor memory, a magnetic core, etc., or a flash memory as a third memory medium (not shown) can be included in the navigation processor 17. The calculation device and the control device, instead of the CPU 31, may be a MPU, etc.

The computer readable recording medium which contains the navigation programs, the search data, the road data, etc., may be of a semiconductor memory, a magnetic tape, a magnetic disc, a magnetic drum, CD-ROM, MD, DVD-ROM, an optical disc, MO, an IC card, an optical card, or a memory card.

In addition, the data recording unit 16 and ROM 33 may be a magnetic core (not shown), a semiconductor memory, etc., a magnetic tape, a magnetic disc, a magnetic drum, CD-ROM, MD, DVD-ROM, an optical disc, MO, an IC card, an optical card, or a memory card. The recording medium may be mounted on the in-vehicle apparatus 14 in advance, and may be exchanged by the driver.

In this embodiment, various programs are recorded in the ROM33 and various data are recorded in the data recording unit 16, but the programs and data may be recorded in an external recording medium in the same manner. In this case, for example, a recording medium such as a flash memory may be included in the navigation processor 17 and the program and data may be written into the recording medium by reading them from the external recording medium. Therefore, by exchanging the external recording medium, the programs and data may be replaced. Also, a control program, etc., for an automatic transmission control apparatus can be recorded in the external recording medium. In this manner, a recorded program is activated, and various routines can be executed based upon the data. The external recording medium may be a magnetic tape, a magnetic disc, a magnetic drum, CD-ROM, MD, DVD-ROM, an optical disc, MO, an IC card, an optical card, or a memory card.

A communication unit 38 has a beacon receiver as a first receiving device which receives data transmitted from an information transmission center as a first information provider. For example, a VICS (Vehicle Information and Communication System) center may transmit data as a radio beacon, an optical beacon, etc., through radio beacon units, optical beacon units, etc., which are disposed along a road. An FM receiver serves as a second receiving device which receives data such as FM multiple broadcasting through a FM broadcasting station and so on. The beacon receiver can receive items of traffic information such as traffic jam information, regulation information, parking lot information, traffic accident information, and service area congestion information. The communication unit 38, through an FM receiver, can receive other information such as news, or weather forecasts, in addition to the traffic information. The beacon receiver and the FM receiver may be integrated as a unit and disposed as a VICS receiver but, alternatively, can be separate.

Also, the communication unit 38 can receive various data such as D-GPS information which indicates a detection error of the GPS 21 which was transmitted from a base station. In addition, based upon the radio beacon, the optical beacon etc., positional information can be received for determining the current location. In that case, the beacon receiver functions as the current location detector.

The navigation apparatus 14 is configured to receive various items of data such as map data, location guidance information and programs which are transmitted from an information center 51, serving as a second information provider, and the received data and programs can be downloaded to the data recording unit 16. Thus, the navigation system includes the navigation apparatus 14, the information center 51, a network 43, etc. The communication unit 38 is connected to the network 43 through an antenna (not shown) or through the communication terminal 39.

The communication terminal 39 may be a mobile telephone, such as a portable telephone, a car telephone, or PHS, portable computer, a personal use portable information terminal, an electric notebook, a television telephone, a game machine, etc., or any such device having a communication function. Also, the network 43 may be a LAN (Local Area Network), WAN (Wide Area Network), an intranet, a portable telephone line network, a telephone line network, a public communication line network, a private communication line network, or a communication line network such as the Internet. A communication unit utilizing CS broadcasting by a broadcasting satellite, BS broadcasting, terrestrial wave digital television broadcasting, FM multiple broadcasting, etc., can also be used. Further, a communication unit such as a non-stop automatic fare payment system (ETC: Electronic Toll Collection) which is utilized in an advanced road traffic system (ITS: Intelligent Transport Systems), or a border area communication system (DSRC: Dedicated Short Range Communications) can also be used.

The information center 51 may be any one operated by an individual, a company, an organization, a local government, a government agency, etc., or may be the VICS center. The information center 51 itself prepares the data, programs, etc., or purchases them from other information providers.

Accordingly, the information center 51 has a server 53 for interactive communication with the navigation apparatus 14, by transmission of data and programs, etc. On that account, the server 53 has a CPU 54, RAM 55, and ROM 56 for processing and control, a communication unit (not shown), etc., and based upon a specific program, data, etc., functions as a computer. A computer can also be configured as the combination of the server 53 and the navigation processing unit 17 of the navigation apparatus 14.

A recording device 57, serving as the information recording unit is connected to the server 53 and, in the recording device 57, various data is recorded as the database and, concurrently, programs are recorded.

In the navigation apparatus 14, when the data, programs etc., are received through the communication unit 38 or the communication terminal 39, the CPU 31 downloads the data, programs, etc., onto a hard disc etc., of the data recording unit 16. In addition, the CPU 31 can download them into RAM32, ROM 33, the flash memory, etc., which are included in the navigation processor 17.

The input unit 34 provides for correction of position at the start of travel and for inputting the destination, and comprises operation keys, push buttons, a jog dial, a cross-shaped key, etc., all of which are disposed in a main body of the in-vehicle apparatus 14, but may be a remote controller. In addition, when the display unit 35 is a touch panel, it is desirable that it provide operation switches such as operation keys, or operation menus displayed on a screen. In this case, by pressing (touching) the operation switch, as with a conventional touch panel, it is possible to effect an input. The input unit 34 may also be a keyboard, a mouse, a bar code reader or a light pen, a remote control device for use in remote operations, a joy stick, etc., separate from the display unit 35, can also be used.

Operation guidance, an operation menu, guidance for operation of keys, a route from the current location to the destination, guidance information along the route, etc., are displayed on the screen of the display unit. The display unit 35 may be a CRT display, a liquid crystal display, a LED display, a plasma display, or a hologram device for projecting a hologram on a front glass, etc.

The sound input unit 36 may be a microphone, etc., for input of necessary information by voice. The sound output unit 37 has a voice synthesis device and a speaker, and sound information, for example, guidance information, gear shift information, etc., in the form of voice messages synthesized by the voice synthesis device, is output from the speaker to an operator. In addition, besides the voice synthesized by the voice synthesis device, various sounds, various guidance information messages recorded in advance in a tape, a memory, etc., can be output from the speaker.

Next, operation of the navigation apparatus 14 having the above-described structure will be described with reference to FIGS. 5–9.

Firstly, when the input unit 34(FIG. 3) is operated by an operator, for example, a driver and the navigation apparatus 14 is activated, a navigation initialization processing unit of the CPU 31 carries out navigation initialization processing, a matching processing unit of the CPU 31 carries out matching processing, and by reading the current location detected by the GPS 21 and the traverse angle detected by the gyro sensor 26 and by integrating the traverse angle, the direction of the vehicle is calculated and, concurrently, the node data, the map data etc., are read out from the data recording unit 16. In addition, from the current location, the direction of the vehicle, the node data, the map data etc., the matching data is configured.

Next, information obtaining processing unit 91(FIG. 1) of the CPU 31 executes a routine for retrieval of information from a map data file, a search data file DF1, a route data file DF2, a facility data file DF3 of the data recording unit 16, reads out the map data, the search data, the route data, the facility data, etc., and records the retrieved information in the RAM 32, etc. In this embodiment, the facility data is used to configure the data of the interchanges for getting on and off, for example, an expressway. In addition, the information obtaining processing unit 91 receives data such as the map data, the search data, the route data, and the facility data from the information center 51 through the communication unit 38, and records the received data into the flash memory, etc.

A map display processing unit of the CPU 31 executes map display processing, and sets a map screen on the display showing a map and concurrently displays the current location and the direction of the vehicle.

In the case where the navigation apparatus 14 is used as a route search device, when the operator inputs the destination by operation of the input unit 34, a destination setup processing unit of the CPU 31 executes destination setup processing, and sets the destination. Also, a route search processing unit of the CPU 31 carries out a route search based upon the search data, to determine a route from a place of departure or current location to the destination.

In case where expressways and/or toll roads with connecting interchanges are included in the route from the place of departure to the destination, the route search processing unit searches the interchanges to identify entrance and exit interchanges.

Figure 6:
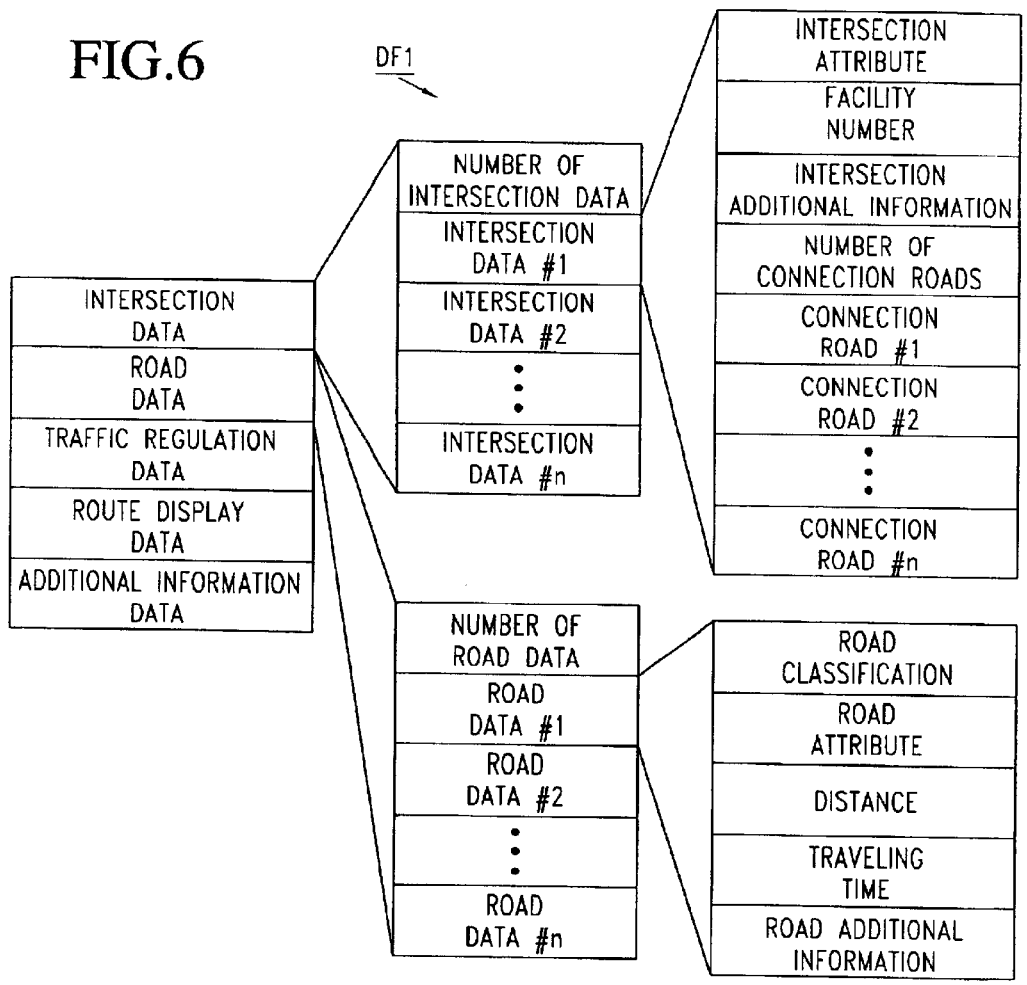
FIG. 6 is a diagram of structure of a search database file in the first embodiment of the invention.

The search data file DF1, as shown in FIG. 6, contains search data such as intersection data, road data, traffic regulation data, route display data, and additional information data. The intersection data contains data such as the number of intersections, and intersection data #1 to #n. Further, in the intersection data #1 to #n, data such as intersection attribute, interchanges, facility number representing a number of a facility in a rest area, etc., additional intersection information, the number of connection roads, and connection roads #1 to #n are included.

The road data includes data such as the number of road data, and road data #1 to #n, etc. Further, for each of roads #1 to #n, road classification, road attribute, distance, travel time, road additional information etc., are recorded, respectively.

Subsequently, a data search processing unit of the CPU 31 executes a data search, and searches route data which was obtained as a route in the route search processing, and reads the intersection data for intersections on the searched route, road data for roads, etc., and concurrently, reads data for entrance and exit interchanges for getting on and off, data such as data of the facility number, and a route number representing a number of the expressway or toll road.

Next, the data search processing unit, searches the data for the interchanges which was read from the route data, and when the interchanges for getting on and off which were read from the route data coincide with the interchanges of the search data, the coinciding (matching) interchanges of the search data are designated as the interchanges for display as a default.

Subsequently, a setup processing unit of the CPU 31 executes a setup for the interchanges, and sets the interchanges for getting on and off.

Figure 9:
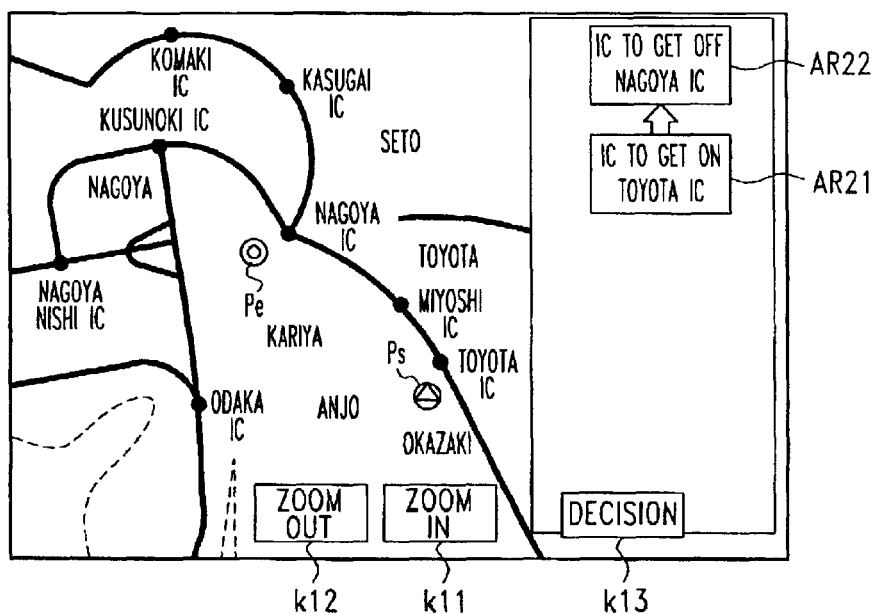
FIG. 9 shows an example of a route confirmation screen in the first embodiment of the invention.

The setup screen display processing unit 92 executes the setup display routine, and forms a route confirmation screen as a first setup screen on the display as shown in FIG. 9, with depiction of the place of departure Ps, the destination Pe, a map showing the searched route, etc. Also, on the route confirmation screen of FIG. 9, k11 designates a zoom-in key for expanding an image of the route confirmation screen, k12 designates a zoom-out key for reducing the image of the route confirmation screen, and k13 designates a decision key.

Also, the setup screen display processing unit 92 sets the areas AR21 and AR22 on the route confirmation screen, and displays the interchange for getting on in the area AR21 and the interchange for getting off in the area AR22, respectively, as defaults.

Figure 7:
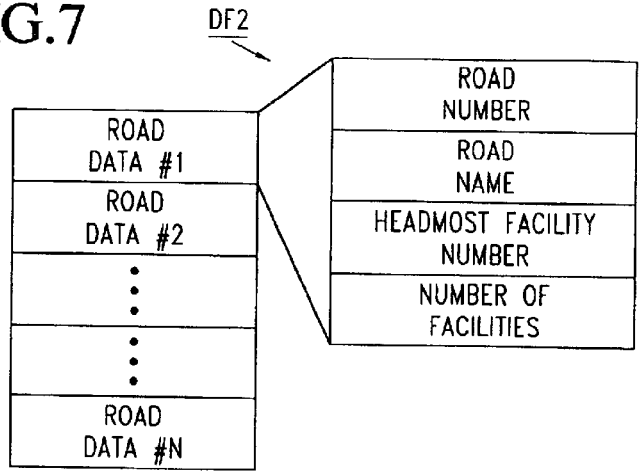
FIG. 7 is a diagram of structure of a road data file in the first embodiment of the invention.
Figure 8:
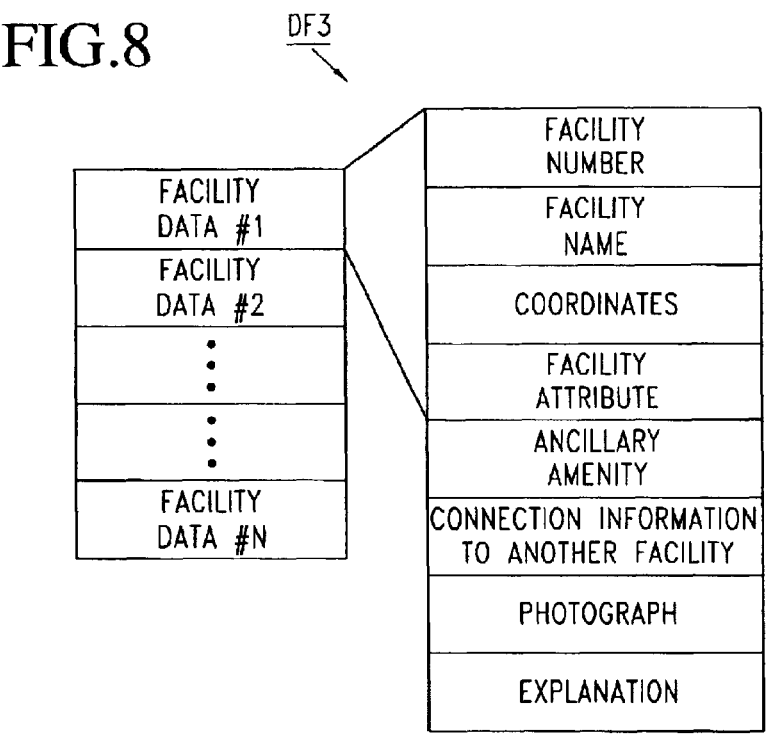
FIG. 8 is a diagram of structure of a facility data file in the first embodiment of the invention.

In addition, in order to form the route confirmation screen, the data recorder 16 includes, besides the search data file DF1, the route data file DF2 as shown in FIG. 7 in which information for expressways and toll roads is recorded, and the facility data file DF3 as shown in FIG. 8 in which information for interchanges on each expressway and toll road is recorded.

In the route data file DF2, the route data #1 to #N is recorded. The route data #1 to #N, includes data for a route number representing a number of a expressway or toll road, a road name, facility number of the closest facility, and/or the number of facilities.

The facility data file DF3 contains recorded therein, facility data #1 to #N. Further, for each facility #1 to #N, data such as a facility number, a facility name, coordinates representing the location of the facility, an attribute of a facility (an entrance of an interchange, an exit of an interchange, a toll booth, a service area, etc.), ancillary amenities in a service area, e.g., a gas station, a restaurant, a restroom, a facsimile machine, a cash dispenser, etc., connection information to another facility (information for facilities on another route accessible at a junction), a photograph of a facility, and/or an explanation of a facility is recorded.

As described above, on the route confirmation screen, the areas AR21 and AR22 show the interchanges for getting on and off and, when the driver depresses an area AR21 or AR22 and thereby designates the interchanges for getting on and off, the interchange setup processing unit executes a setup routine, and sets the interchanges for getting on and off.

Subsequently, the route search processing unit again executes the route search routine, and so as to correspond to the set interchanges for getting on and off, on the basis of the searched data, searches for a route from the place of departure Ps (current location) to the destination Pe.

Then, the setup screen display processing unit 92 again executes the setup display routine, forms the route confirmation screen on the display, and displays a map indicating the place of departure Ps, the destination Pe and the searched route, as well as the interchanges for getting on and off, etc., on the route confirmation screen.

Figure 5:
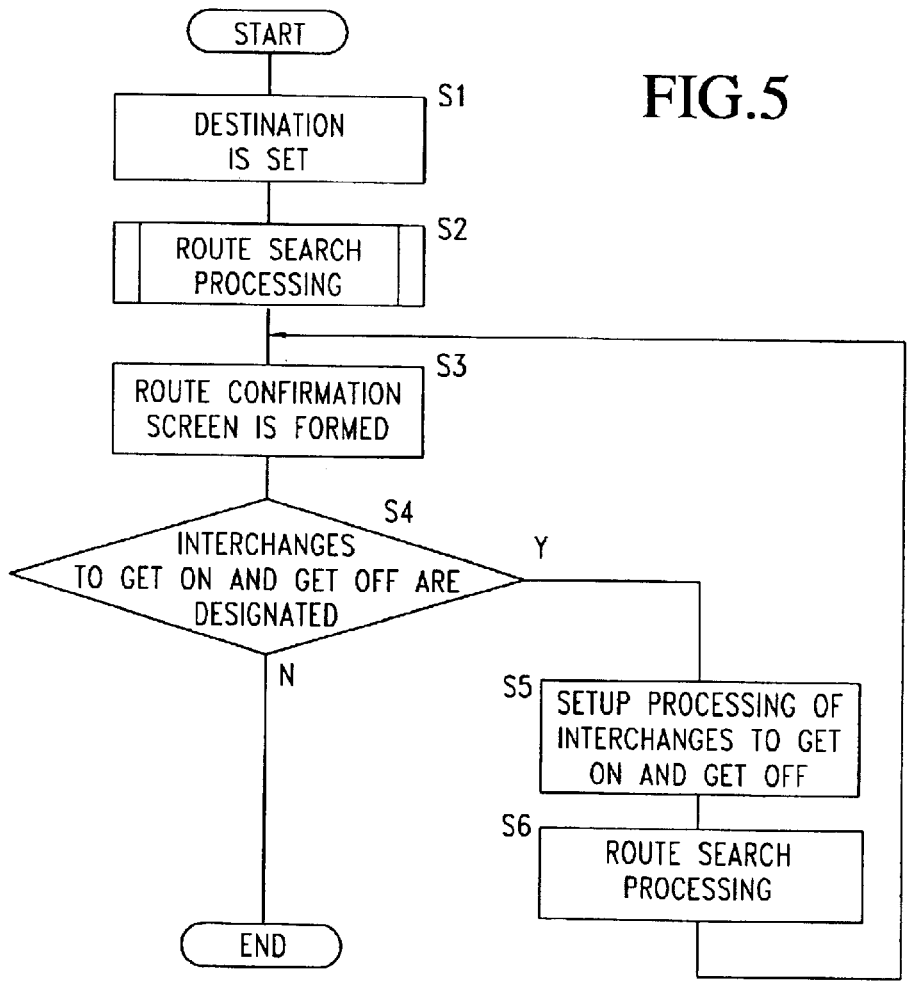
FIG. 5 is a flow chart of a routine executed by the navigation apparatus in the first embodiment of the invention.

Next, the flow chart of FIG. 5 will be described.

Step S1 The destination is set.
Step S2 The route search is executed.
Step S3 The route confirmation screen is formed.
Step S4 It is judged whether or not the interchanges for getting on and off have been designated. When the interchanges for getting on and off have been designated, the routine goes to Steps S5, S6 and so on, and when they have not been designated, the routine is ended.
Step S The setup routine for the interchanges for getting on and off is executed.
Step S6 The route search subroutine is executed, and then the routine returns to Step S3.

A subroutine for the setup of the interchanges for getting on and off, i.e., Step S5, will now be described with reference to FIGS. 10–13.

Figure 12:
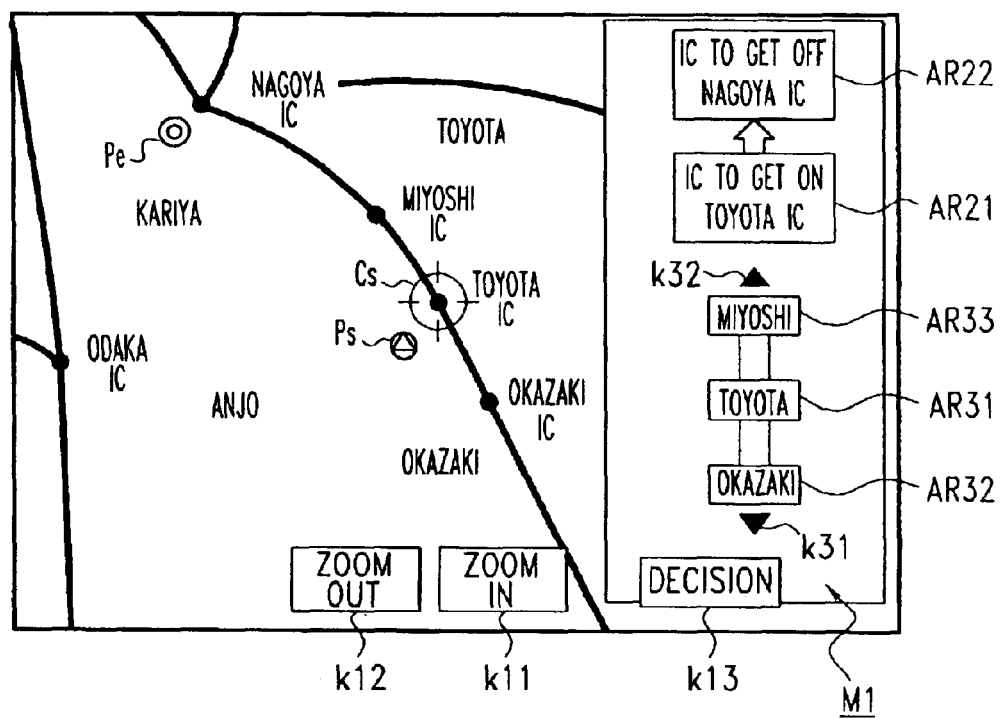
FIG. 12 shows an example of a route setup screen in the first embodiment of the invention.

Firstly, the interchange setup processing unit judges whether or not the interchange which was designated by the driver is an interchange for getting on, and in case where it is an interchange for getting on, the setup screen display processing unit 92 forms a route setup screen as a second setup screen, as shown in FIG. 12, on the display, and displays in one area of the route setup screen, a map which is formed based upon the map data and has, as its central focus, the interchange for getting on which was located by the route search processing unit in Step S2, and, in another area, e.g., as a window, of the route setup screen, a simple road chart M1 which includes interchanges neighboring the interchange for getting on. In this embodiment, while designed so that the set interchange is displayed at the center of the map, the interchange need not necessarily displayed be so centered.

In the simple road chart M1, the interchange for getting on is displayed as a default in center area AR31, and in areas AR32 and AR33 the interchanges neighboring the interchange set for getting on are displayed as defaults and side-by-side with the interchange set for getting on. These neighboring interchanges may be interchanges on the searched route adjacent to and on opposite sides of or on one side of the "default" interchange shown in AR31. Keys k31 and k32 are displayed adjacent to the respective areas AR32 and AR33, and each time that a key k31 or k32 is depressed (or touched), the interchange is changed cyclically. For example, each time the key k31 is depressed, an interchange in the direction of travel closer than the interchange displayed in the area AR31 is displayed cyclically in the area AR32.

Next, a scroll judgment unit of the setup processing unit executes a scroll judgment routine and, for example, judges whether or not the map was scrolled responsive to a specific interchange on the map being selected (pressed) by the driver. When the map has been scrolled, the setup screen display processing unit 92 moves the interchange designated by the driver to the center of the map, and the interchange is displayed with superposing a cursor Cs thereon. Subsequently, the setup screen display processing unit 92, with reference to the facility data file DF3 (FIG. 8), reads data for the interchange which is the closest to the center of the map, and changes the simple road chart M1 so as to correspond to the interchange at the center of the map. In this manner, when the map has been scrolled, the route setup screen and the simple road chart M1 can be changed so as to correspond to the map. Also, the interchange for getting on which is the closest to the center of the map is displayed at a fixed place in the simple road chart M1.

This embodiment is designed so that data for the interchange which is the closest to the center of the map is retrieved, but it is possible to read out data of an interchange other than that closest to the center of the map.

Subsequently, the scroll judgment processing unit judges whether or not the simple road chart M1 was scrolled responsive to depression of one of the keys k31 and k32 by the driver. When the simple road chart M1 has been scrolled, the setup screen display processing unit 92 changes ("renews") the simple road chart M1 so as to correspond to the depressed key (k31 or k32) and, concurrently, renews the map by aligning the center of the map with the interchange of the area AR31 at the center of the simple road chart M1. In this manner, when the simple road chart M1 has been scrolled, the simple road chart M1 can be renewed, and concurrently, the route setup screen and the map can be changed ("renewed") to correspond to the simple road chart M1.

Subsequently, when the decision key k13 is depressed by the driver to determine an interchange, the interchange setup processing unit sets the decided interchange as the interchange for getting on, and the setup screen display processing unit 92 displays the interchange for getting on in the area AR21. In this manner, the interchange for getting on which was selected by the driver can be displayed on the map.

Figure 13:
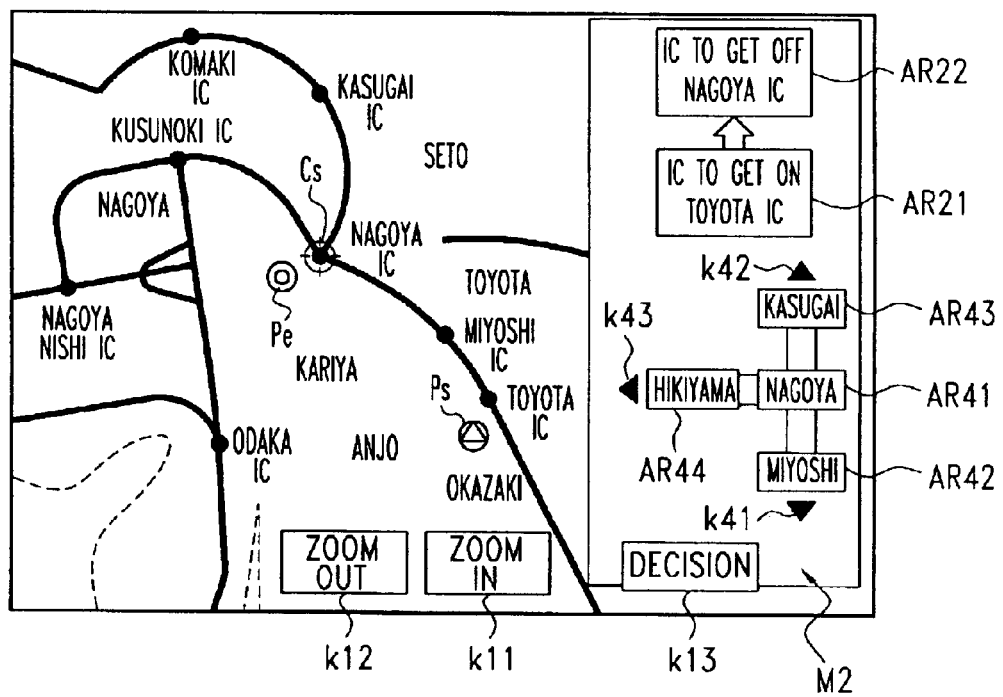
FIG. 13 shows another example of a route setup screen in the first embodiment of the invention.

When the interchange designated by the driver is an interchange for getting off, the setup screen display processing unit 92 forms a route setup screen as shown in FIG. 13 on the display and, on the route setup screen, displays a map centrally focused on the interchange for getting off which was obtained by execution of the route search routine in Step S2, and a simple road chart M2 which includes an interchange or interchanges neighboring the designated (set) interchange for getting off.

In the simple road chart M2, the interchange for getting off is displayed as a default in a central area AR41, and interchanges neighboring the interchange shown in AR41 are displayed in areas AR42–AR44 as defaults side-by-side with the set interchange of area AR41. Keys k41 to k43 are displayed adjacent the respective areas AR42 to AR44, and each time one of the keys k41 to k43 is depressed, the corresponding interchange is changed cyclically.

Next, the scroll judgment processing unit judges whether or not the map has been scrolled by depression of a specific interchange on the map by the driver or otherwise. When the map is found to have been scrolled, the setup screen display processing unit 92 moves the interchange designated by the driver to the center of the map, and a cursor Cs is superimposed thereon. Subsequently, the setup screen display processing unit 92 retrieves, from the facility data, data for the interchange which is the closest to the center of the map, and changes the simple road chart M2 so as to correspond to the interchange at the center of the map. In this manner, when the map is scrolled, the route setup screen and the simple road chart M2 can be changed ("renewed") so as to correspond to the map. At a fixed position on the simple road chart M2, the exit interchange closest to the center of the map is displayed.

While this embodiment is designed so that the setup screen display processing unit 92, when the map is scrolled, concurrently renews the simple road charts M1 and M2, it is also possible to renew the simple road charts M1 and M2 when the scrolling of the map has been completed.

Subsequently, the scroll judgment processing unit judges whether or not the simple road chart M2 has been scrolled by depression of one of the keys k41 to k43 by the driver or otherwise. When the simple road chart M2 has been scrolled, the setup screen display processing unit 92 renews the simple road chart M2 so as to correspond to the depressed key, and concurrently, renews the map by aligning the center of the map with the interchange of the area AR41 at the center of the simple road chart M2. In this manner, when the simple road chart M2 is scrolled, the simple road chart M2 can be renewed, and concurrently, the route setup screen and the map can be changed so as to correspond to the simple road chart M2.

Subsequently, when the decision key k13 is depressed by the driver to designate an interchange, the interchange setup processing unit sets the designated interchange as the interchange to get off, and the setup screen display processing unit 92 displays the set interchange in the area AR22. In this manner, the interchange which has been selected by the driver can be displayed on the map.

In addition, in this embodiment, in the simple road charts M1 and M2, the interchanges are displayed side-by-side in consideration of their neighboring relationship. Also, the interchanges for getting on and off in the simple road charts M1 and M2 are displayed and identified by their names. The displayed name may be an official name or may be an abbreviated name.

When the setup of the interchanges for getting on and off is completed, the interchange setup processing unit sends data for each facility number for the interchanges and a route number for each road connecting to the interchanges to the route search processor for. use in execution of a search routine.

In the figures, k11 designates a zoom in key, and k12 designates a zoom out key.

In this manner, with the departure Ps, the destination Pe, the map of the searched route, the searched interchanges for getting on and off, etc., displayed on the route confirmation screen, the driver can easily, not only confirm a positional relationship of the place of departure Ps, the destination Pe and the interchanges for getting on and off, also understand connections of each expressway and toll road, sea ferry road, open road, etc., and it becomes possible to estimate a route when the interchanges for getting on and off have been selected, and to set interchanges for getting on and off which correspond to the place of departure Ps and the destination Pe.

Furthermore, by scrolling the displayed map, it is possible to display on the route setup screen interchanges for getting on and off other than those in the vicinity of the interchanges identified by the route search processing and, thereby, the driver can set the interchanges for getting on and off in consideration of various conditions. Also, since it is possible to scroll the map between different expressways and toll roads, it is possible to select and set predetermined interchanges for getting on and off from a widespread area. Further, since it is possible to scroll the map in an arbitrary direction, it is possible to select and set predetermined interchanges for getting on and off an even greater widespread area.

Also, since the interchanges for getting on and off set as the defaults can be changed by scrolling the simple road charts M1 and M2, it is possible to finely adjust the setting of the interchanges for getting on and off and to simplify the work of setting the interchanges.

In addition, while this embodiment is designed so that once the destination Pe is set, the route search routine is then executed, and the route thus determined ("searched route") is displayed on the route confirmation screen, and the driver designates the interchanges for getting on and off on the route confirmation screen, it is also possible to set the interchanges for getting on and off without executing the route search routine.

Also, this embodiment designed so that after the interchanges have been set, the route search routine is again executed, but it is not necessary to execute a new search.

Figure 10:
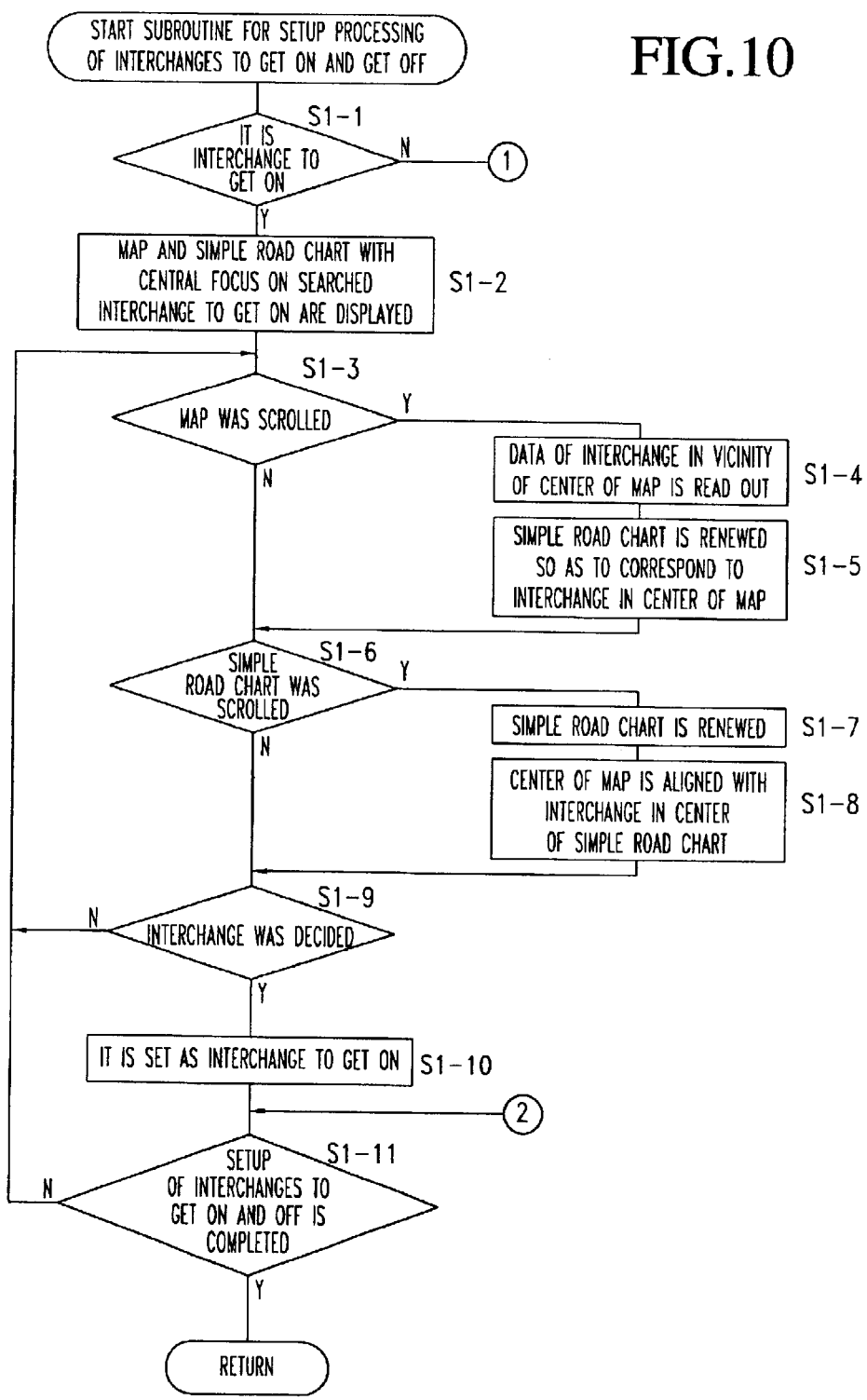
FIG. 10 is a flow chart of a first portion of a subroutine for set up processing of interchanges for getting on and off in the first embodiment of the invention.
Figure 11:
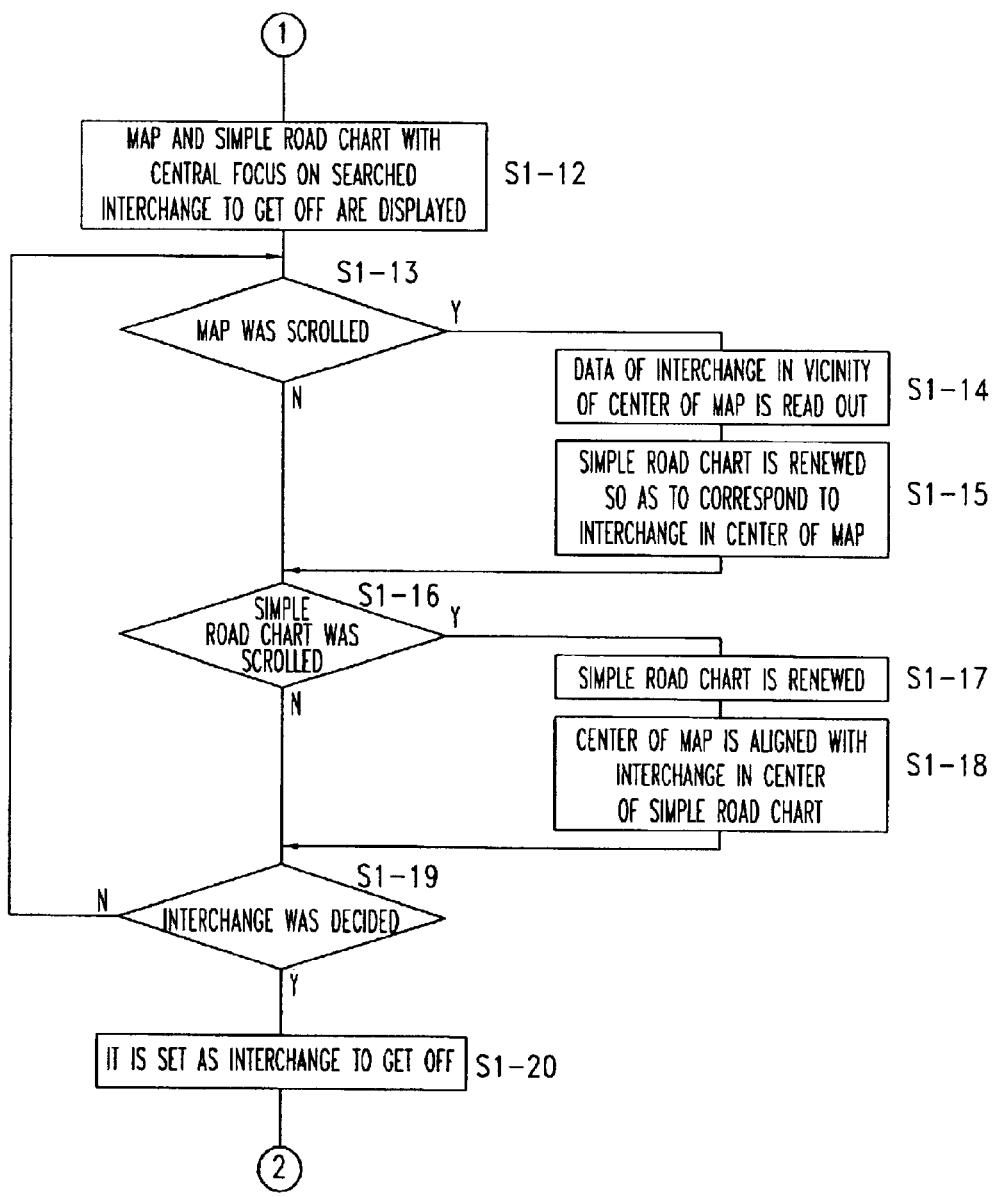
FIG. 11 is the other portion of the flow chart of the subroutine of FIG. 10.

Next, the flow chart of FIG. 10 will be described.

Step S1-1 It is judged whether or not the designated interchange is an interchange for getting on. When it is an interchange for getting on, the routine goes to Step S1-2, and in case that it is not an interchange for getting on, the routine goes to Step S1-2.

Step S1-2 The map and the simple road chart M1 are displayed with a central focus on the located interchange (located by the search) for getting on.

Step S1-3 It is judged whether or not the map has been scrolled. In the case where the map has been scrolled, the routine goes to Step S1-4, and in the case where it has not been scrolled, the routine goes to Step S1-6.

Step S1-4 Data for the interchange in the vicinity of the center of the map is read out.

Step S1-5 The simple road chart M1 is changed so as to correspond to the interchange at the center of the map.

Step S1-6 It is judged whether or not the simple road chart M1 has been scrolled. In the case that the simple road chart M1 has been scrolled, the routine goes to Step S1-7, and in case where it has not been scrolled, the routine goes to Step S1-9.

Step S1-7 The simple road chart M1 is renewed.

Step S1-8 The center of the map is aligned with an interchange at the center of the simple road chart M1.

Step S1-9 It is judged whether or not an interchange has been designated. When an interchange has been designated, the routine goes to Step S1-10, and when there has been no such designation, the routine returns to Step S1-3.

Step S1-10 The interchange for getting on is set.

Step S1-11 It is judged whether or not the setup of the interchanges for getting on and off has been completed. When the setup of the interchanges for getting on and off has been completed, the routine returns, and when not completed, the routine returns to Step S1-3.

Step S1-12 The map and the simple road chart M2 are displayed with a central focus on the located interchange for getting off.

Step S1-13 It is judged whether or not the map has been scrolled. When the map has been scrolled, the routine goes to Step S1-14, and when it has not been scrolled, the routine goes to Step S1-16.

Step S1-14 Data for an interchange in the vicinity of the center of the map is retrieved.

Step S1-15 The simple road chart M2 is changed so as to correspond to an interchange at the center of the map.

Step S1-16 It is judged whether or not the simple road chart M2 has been scrolled. In case that the simple road chart M2 has been scrolled, the routine goes to Step S1-17, and when it has not been scrolled, the routine goes to Step S1-19.

Step S1-17 The simple road chart M2 is renewed.

Step S1-18 The center of the map is aligned with the interchange at the center of the simple road chart M2.

Step S1-19 It is judged whether or not an the interchange has been designated. When an interchange has been designated, the routine goes to Step S1-20, and when it has not been designated, the routine returns to Step S1-13.

Step S1-20 The interchange for getting off is set.

When gasoline or a meal is needed, information (hereinafter referred to as "SA/PA information")as to facilities such as a service area, or a parking area (hereinafter referred to as "SA/PA facility") is needed, conventionally a driver must operate the input unit 34 to input a specific name of the SA/PA facility, so that the chore of obtaining the SA/PA information is troublesome. As a solution to this problem, a second embodiment of the invention is designed to display an ancillary amenity, e.g,. gas station, restaurant, restroom, facsimile machine, cash dispenser, or other located in the SA/PA facility, as will now be described with reference to FIGS. 14 to 17.

In this second embodiment an amenity stop setup processing unit of the CPU 31 (FIG. 3) executes an amenity stop setup routine as an interrupt task. A stop setup key is displayed on a map screen, and when the driver depresses the stop setup key, the amenity stop setup processing unit starts the amenity stop routine as an interrupt task.

Figure 15:
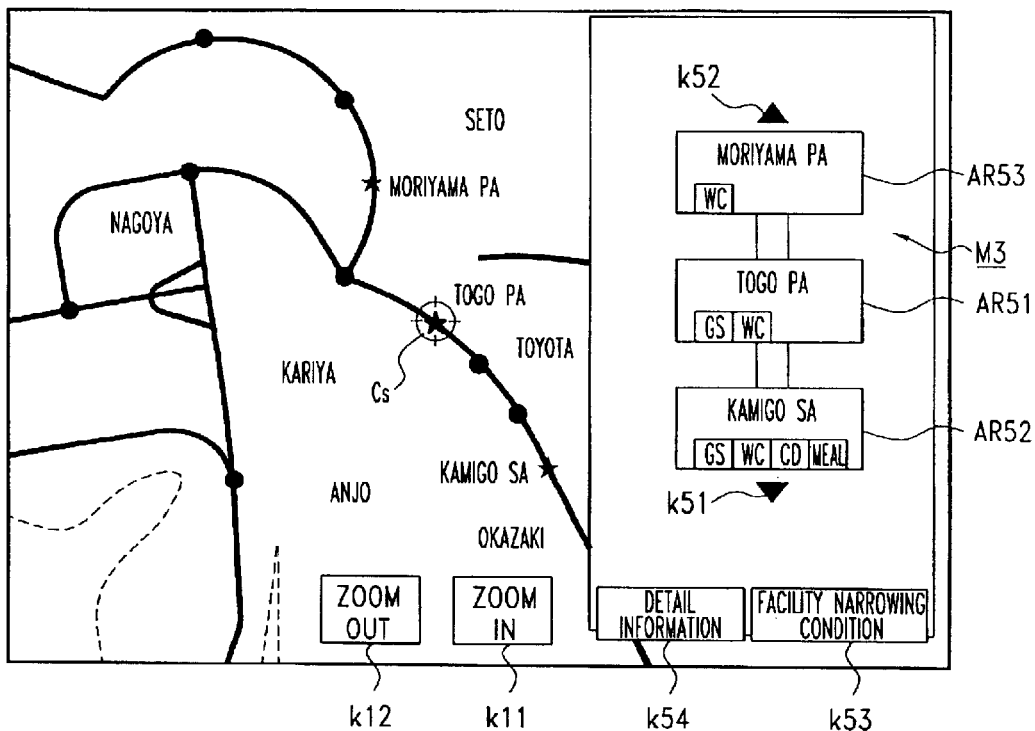
FIG. 15 shows a first example of a service stop setup screen of the second embodiment of the invention.

Firstly, when the stop setup key is depressed, the stop setup processing unit, with reference to the facility data file DF3 (FIG. 8), reads out the facility data for the SA/PA facility in the vicinity of the center of the map and, concurrently, forms a stop setup screen as shown in FIG. 15 on the display and, on the stop setup screen, displays a map which includes the set SA/PA facility and a simple road chart M3 which includes a SA/PA facility neighboring the set SA/PA facility.

In the simple road chart M3, the SA/PA facility in the vicinity of the center of the map is displayed as a default in a central area AR51, and in areas AR52 and AR53, neighboring SA/PA facilities are displayed as defaults, and concurrently, an ancillary amenity of each SA/PA facility is displayed. Also, keys k51 and k52 are displayed adjacent to each area AR52 and AR53, and each time one of the keys k51 and k52 is depressed, the SA/PA facility is changed cyclically. In addition, the ancillary amenity which is displayed in the areas AR51 to 53 is displayed as "GS", "meal", "WC", "Fax", "CD", and "Other" in case of a gas station, a restaurant, a restroom, a facsimile machine, a cash dispenser, or other, respectively.

In this embodiment, in the simple road chart M3, besides each SA/PA facility, according to need, toll booths, interchanges, interchanges for getting on and off, etc., are displayed side-by-side in consideration of their proximity to the designated interchange(s). Also, each SA/PA facility, toll booth, interchange, interchange for getting on and off, etc., in the simple road chart M3 are displayed with their names. In this case, the name may be an official name or may be an abbreviated name.

In addition, in the amenity setup screen, k11 designates a zoom-in key for expanding an image of the stop setup screen, k12 designates a zoom-out key for reducing the image of the stop setup screen, k53 designates a facility narrowing condition key which is depressed for setting a narrowing condition for selection of a SA/PA facility in the case that the number of SA/PA facilities is large, k54 designates a detail information key which is depressed for displaying detailed information for the SA/PA facility, and Cs designates a cursor.

Next, the scroll judgment processing unit of the service stop setup processing. unit judges whether or not the map has been scrolled by designation of a specific SA/PA facility by a driver or otherwise. And, when the map has been scrolled, the service stop setup processing unit moves the SA/PA facility which was designated by the driver to the center of the map, and displays the SA/PA facility with the cursor Cs superimposed thereon. Subsequently, the service stop setup processing unit, with reference to the facility data, reads out data for the ancillary amenities available at the SA/PA facility in the vicinity of the center of the map, and renews the simple road chart M3 so as to correspond to SA/PA facility at the center of the map. In this manner, when the map was scrolled, the service stop setup screen and the simple road chart M3 can be renewed so as to correspond to the map.

Subsequently, the scroll judgment processing unit judges whether or not the simple road chart M3 is scrolled by depression of a key k51 or k52 by the driver. And, when the simple road chart M3 is scrolled, the scroll judgment processing unit renews the simple road chart M3 so as to correspond to the depressed key k51 or k52, and concurrently, renews the map by aligning the center of the map with the SA/PA facility of the area AR51 at the center of the simple road chart M3. In this manner, when the simple road chart M3 is scrolled, the simple roach chart M3 is renewed, and concurrently, the service stop screen and the map can be renewed so as to correspond to the simple road chart M3.

Subsequently, the service stop setup processing unit judges whether or not the facility narrowing condition key k53 has been depressed by the driver. In the case when the facility narrowing condition key k53 has been depressed, a facility selection narrowing condition setup processing unit of the service stop setup processing unit executes facility selection narrowing condition setup processing, and sets a facility selection narrowing condition for narrowing selection of the SA/PA facilities.

Figure 16:
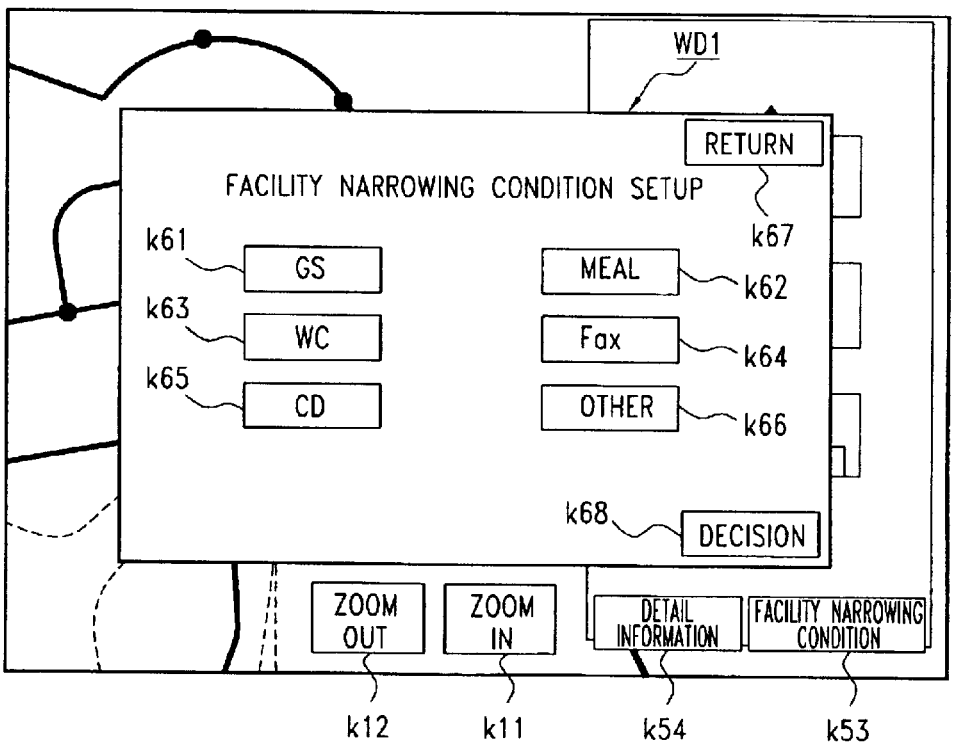
FIG. 16 shows a second example of a service stop setup screen of the second embodiment of the invention.

When the facility selection narrowing condition key k53 is depressed, a facility narrowing condition setup window WD1 is displayed as shown in FIG. 16. In the facility narrowing condition setup window WD1, narrowing keys such as a GS key k61, a meal key k62, a WC key k63, a Fax key k64, a CD key k65, and a key k66 corresponding, respectively, to a gas station, a restaurant, a rest room, a facsimile machine, a cash dispenser, and other ancillary facility, and a return key k67 and a decision key k68 are displayed.

Accordingly, when the driver depresses the facility selection narrowing condition key k53 and then selects and depresses a specific narrowing key, followed by depression of the decision key k68, the facility selection narrowing condition setup processing unit sets a facility selection narrowing condition in accordance with the selected narrowing key. In this manner, when the facility selection narrowing condition is set, the selection is narrowed to only that SA/PA facility (or facilities) in which there is an ancillary amenity which corresponds to the selected narrowing key.

As a result, the service stop setup processing unit reads out only facility data for the SA/PA facility which was selected from among the SA/PA facilities satisfying the narrowing condition(s) and located in the vicinity of the center of the map and, concurrently, on the display, forms a service stop setup screen, and on the service stop setup screen, displays a map which has the narrowly selected SA/PA facility in the vicinity of the center of the map. At the same time (on the same screen) are displayed the SA/PA facility, and the simple road chart M3 including SA/PA facility(s) adjacent to the selected (set) SA/PA facility satisfying the narrowing condition.

Figure 17:
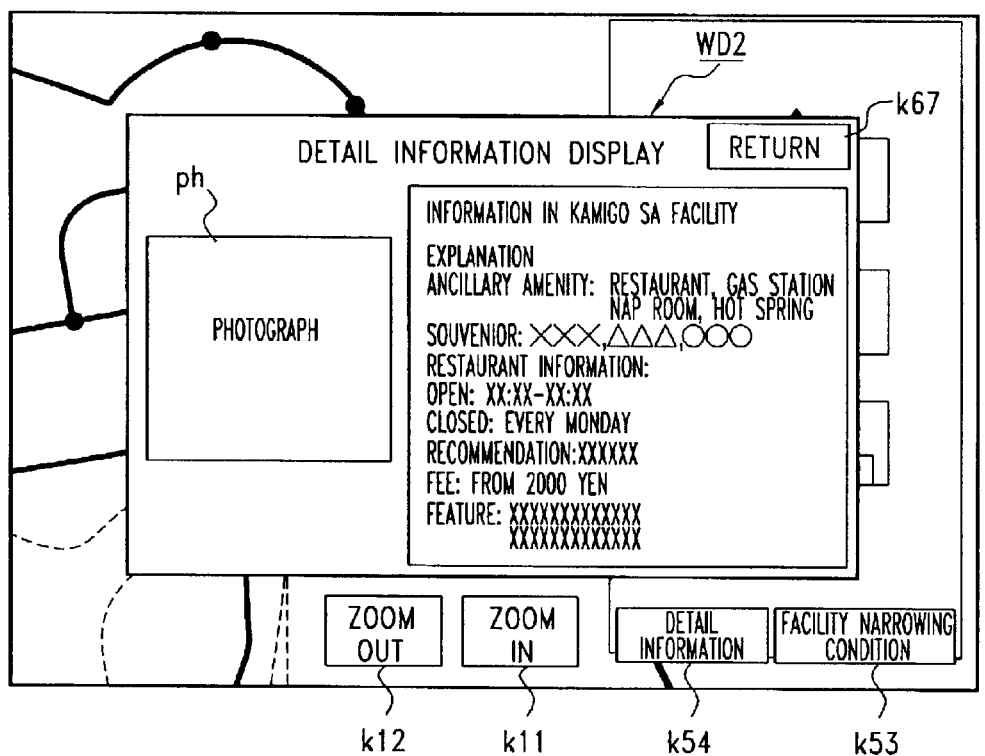
FIG. 17 shows a third example of a service stop setup screen of the second embodiment of the invention.

In addition, when the driver depresses the detail information key k54, a detail information display window WD2 appears on the screen as shown in FIG. 17. In the detail information display window WD2, detailed information for an ancillary amenities, etc., at each SA/PA facility is displayed by characters, and concurrently, a photograph ph of a specific place in the SA/PA facility is displayed.

Subsequently, when the area AR51 or a not-shown decision key is depressed by the driver and the SA/PA facility is selected, the service stop setup processing unit sets the selected SA/PA facility as a service stop, and the processing is completed.

In this manner, since the service stop is set based upon the facility data, a map and a simple road chart M3 including the set SA/PA facility are displayed on the service stop setup screen of the display, and since it is possible to obtain the SA/PA information without inputting the name of a SA/PA facility, it is possible to simplify the task of obtaining SA/PA information.

Next, the flow chart of FIG. 14 will be described.

Step S11 The facility data for the SA/PA facility in the vicinity of the center of the map is read out and the simple road chart M3 is displayed.

Step S12 It is judged whether or not the map has been scrolled. In case that the map has been scrolled, the routine goes to Step S13, and in case that the map has not been scrolled, the routine goes to Step S15.

Step S13 Data for an ancillary amenity of the SA/PA facility in the vicinity of the center of the map is retrieved.

Step S14 The simple road chart M3 is renewed so as to correspond to the SA/PA facility at the center of the map.

Step S15 It is judged whether or not the simple road chart M3 has been scrolled. In the case that the simple road chart M3 has been scrolled, the routine goes to Step S16, and in the case that it is has not been scrolled, the routine goes to Step S18.

Step S16 The simple road chart M3 is renewed.

Step S17 The center of the map is aligned with the SA/PA facility at the center of the simple road chart M3.

Step S18 It is judged whether or not the facility narrowing condition key k53 has been depressed. In case that the facility narrowing condition key k53 has been depressed, the routine goes to Step S19, and in the case that key k53 has not been depressed, the routine goes to Step S22.

Step S19 The facility narrowing condition is set.

Step S20 It is judged whether or not the setup has been completed. In the case that the setup has been completed, the routine goes to Step S21, and in the case that the setup has not been completed, the routine returns to Step S19.

Step S21 The map and the simple road chart M3 are displayed so as to correspond to the narrowing condition, and the routine returns to Step S12.

Step S22 It is judged whether or not the SA/PA facility has been selected. In case that the SA/PA facility has been selected, the routine goes to Step S23, and in case that it has not been decided, the routine returns to Step S12.

Step S23 The selected SA/PA facility is set as the service stop, and the processing is completed.

In the above-described embodiments, when the map is scrolled, the simple road chart is renewed so as to correspond to the map, and it is thereby possible to simplify the setting of interchanges for getting on and off.

With conventional vehicle mounted navigation systems, when an operator utilizes an input device to set the destination, based upon the set destination and current location of the vehicle, a route from the current location to the destination is searched, and guidance along the searched route is provided. Such a route search is designed so that the route determined by the search represents the minimal distance and/or time from the current location to the destination.

The route determined by the search normally consists of major roads, such as a road having at least a predetermined width (e.g., width of a road 5 m or more), a state road, a federal road, and/or an expressway. For example, when a road having a narrow width, such as a back street, is displayed on a screen as part of the search route, the display becomes complicated and it becomes difficult to understand the route, and also, when the guidance is for a road having a narrow width, the guidance becomes so difficult to follow that the driver becomes exhausted. On the contrary, by selecting only roads having at least a predetermined width and major roads as the subject of search, it becomes possible to easily grasp the guidance.

However, in the conventional navigation apparatus, a road which is actually easily driven faster may not be included in the route determined by the search. Consider, for example, a case where a federal road has a narrow width and many intersections and traffic lights and runs substantially parallel with a state road which has a wide width and few intersections and traffic lights. In this case, since the easier driven road is the state road, it is apparent that a route including the state road is more desirable than a route along the federal road. However, with the conventional navigation apparatus, in searching a route, factors such as the number of intersections and traffic lights which influence driving ease and traveling speed are not considered, and priority is judged based upon road classification, and thus the system is designed so that the federal road is selected in preference to the state road. Accordingly, conventionally the route following the federal road is searched, and the state road which is more easily travelled is not included in the searched route.

Additional embodiments will now be described in detail with reference to FIGS. 18–21.

Figure 18:
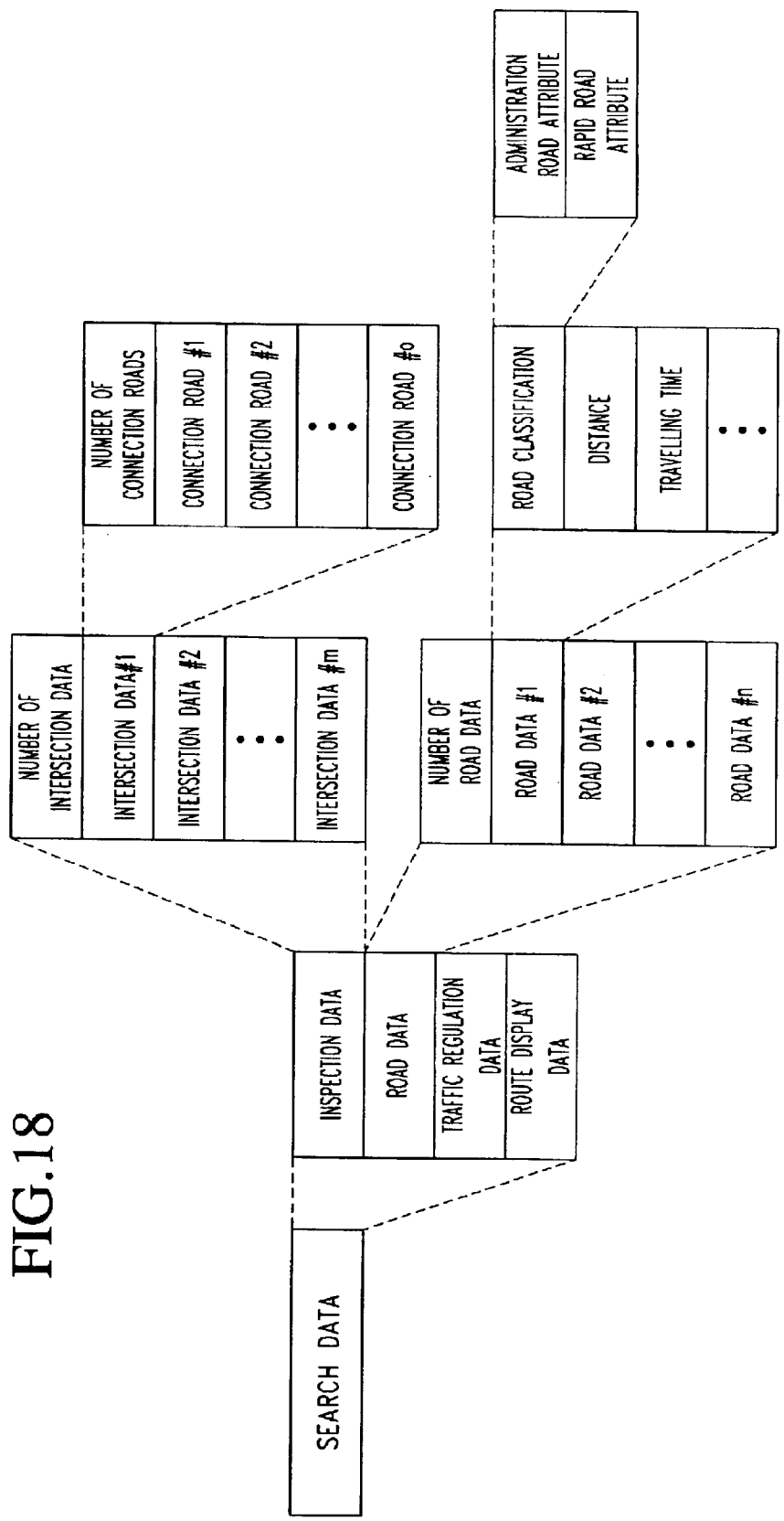
FIG. 18 is a diagram of structure of search data in another embodiment of the invention.

The search database, as shown in FIG. 18, includes intersection data, road data, traffic regulation data and route display data. The intersection data includes, in addition to the numbers designating intersections for which data is stored, data relating to respective intersections (intersection data) with the associated identification numbers. Further, in the respective intersection data, in addition to the numbers of the roads which connect to a corresponding intersection, i,.e., the number of connection roads, data is stored associated with numbers for identifying the respective connection roads. In addition, the intersection data classifies the intersections, i.e., makes a distinction as to whether or not an intersection has a traffic light.

In the road data, in addition to the number of roads whose data are stored, data relating to respective roads is stored as the road data with identification numbers associated therewith. The data for each road includes road classification, length of the road, traveling time required to travel the road and so on. Further, the road classification data includes administration road attributes such as identification as a federal road, a state road, major local road, open road, or expressway and rapid road information for identifying whether or not it is a rapid road.

Figure 19:
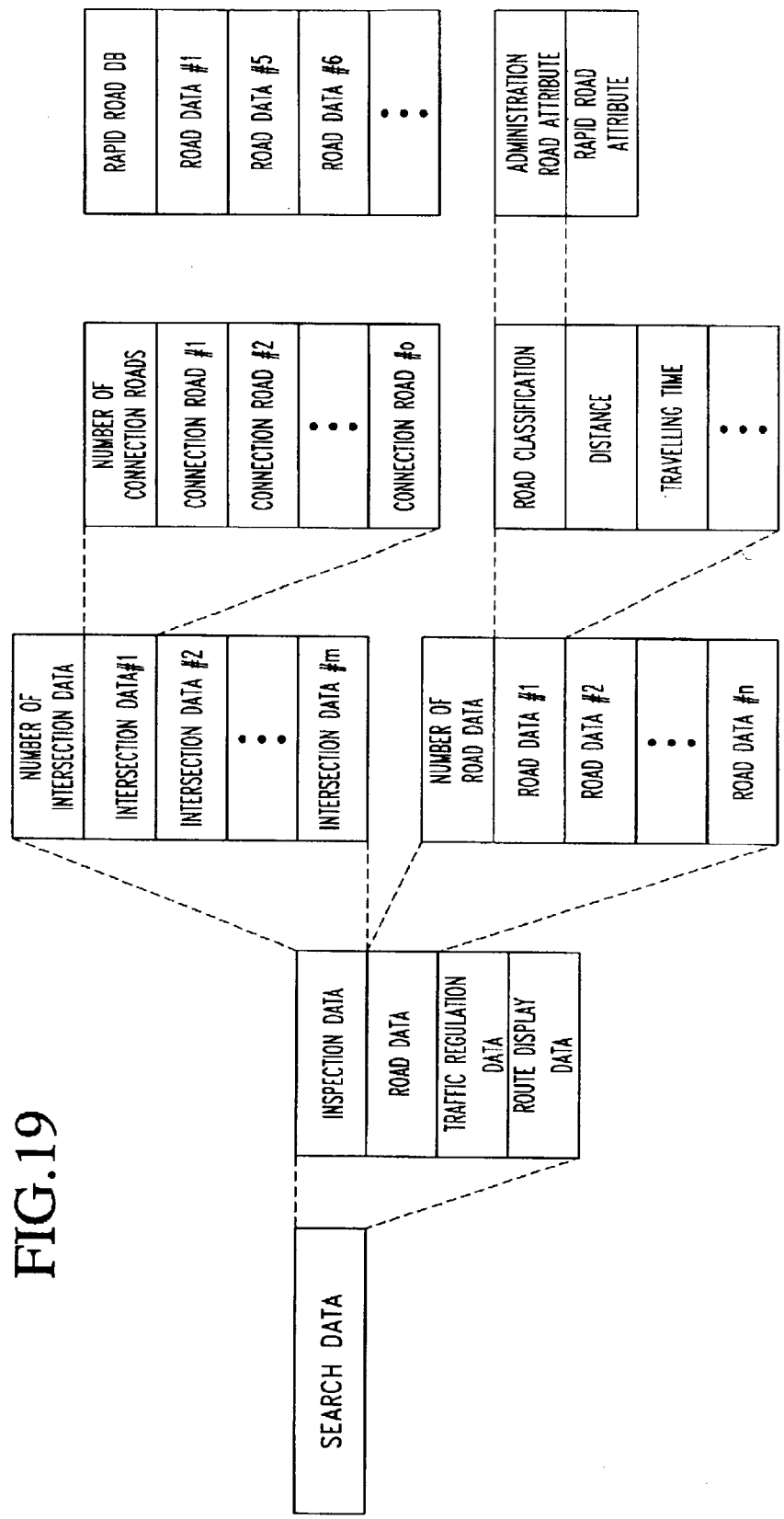
FIG. 19 is another diagram of structure of search data in yet another embodiment of the invention.

The search database may have a structure as shown in FIG. 19. In this case, the rapid road information is not included in the road classification, and a rapid road database is established independently. In the rapid road database, rapid road information for identifying whether or not a road is a rapid road is stored with numbers of corresponding road data attached thereto.

Also, it is desirable that data for road width, slope, cant, altitude, nature of the road surface, whether or not the road has a center strip, the number of lanes, a point where the number of lanes decreases, a point where a road width decreases, etc., be included in the road database. In case of an expressway and an arterial road, respective traffic lanes in opposed directions are stored as separate road data, and processed as a double road. For example, in the case of an arterial road having two lanes or more in each direction, it, is processed as a double road, and a traffic lane in one direction and traffic lanes in the opposite direction are stored as independent roads in the road data, respectively. Further, for a corner, it is desirable that the data include radius of curvature, intersection, T-junction, entrance to the corner, etc. Further, road attributes such as a railroad crossing, a rampway as an entrance to an expressway, a toll booth, a descending slope, an ascending slope, etc., may be included.

Figure 20:
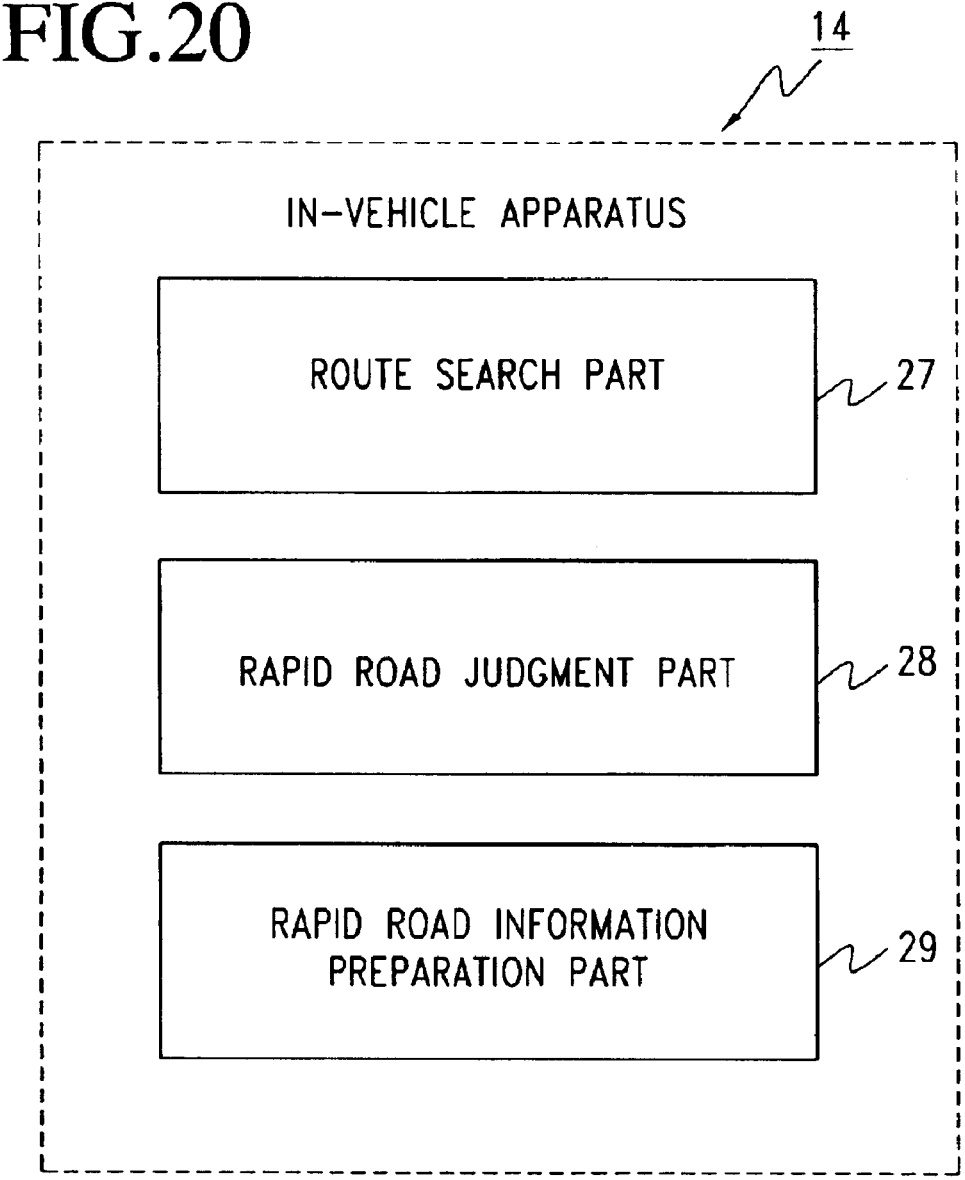
FIG. 20 is a block diagram of an in-vehicle apparatus of the navigation system in another embodiment of the invention.

In this embodiment, as shown in FIG. 20, the in-vehicle apparatus 14 has, from a functional viewpoint, a route search section 27 for searching a route, a rapid road judgment section 28 for judging whether a road is a rapid road or not, and a rapid road information preparation section 29 for preparing rapid road information to identify whether or not a road is a rapid road.

The route search section 27 searches for a route in a conventional manner, and when the destination is set, accesses the search database shown in FIG. 18, and sets a route from the current location to the destination. In addition, in the search database, as shown in FIG. 21, the road network data is hierarchized, and it is desirable that the route search section 27 search for a route using the hierarchized road network data.

Figure 21:
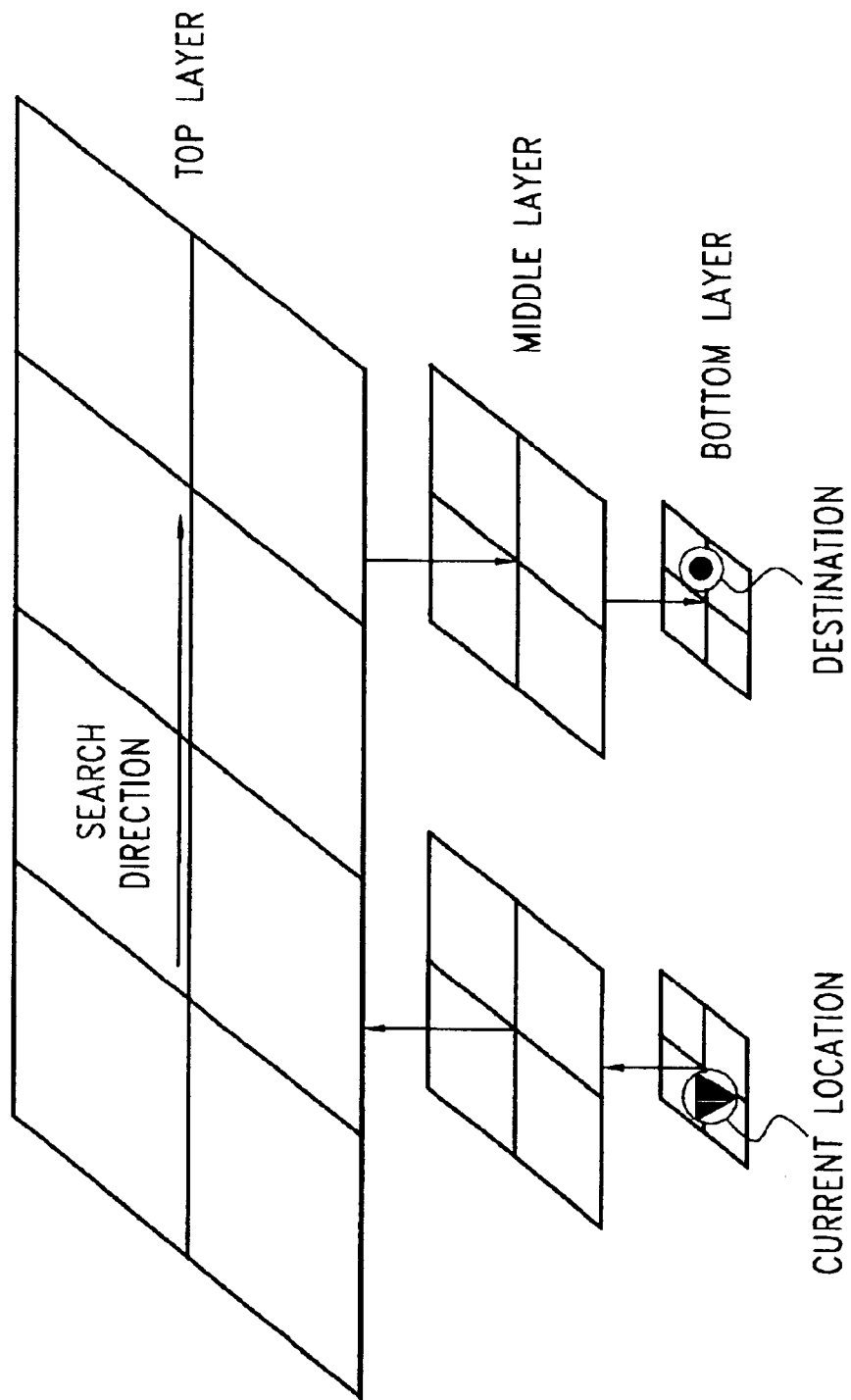
FIG. 21 is a diagram of the hierarchical structure of road network data in an embodiment of the invention.

In this case, the road network data is, for example, as shown in FIG. 21, hierarchized in three layers, and a top layer comprises one block with an arterial road network comprising only expressways and major federal roads across the country stored therein. The middle layer comprises a plurality of blocks covering areas of a predetermined scope, and in each block, for example, a basic road network comprising expressways, federal roads, major local roads, etc., each of which has a scope covering about 90 km square is stored. The bottom layer comprises a plurality of blocks covering areas of a predetermined scope, and in each block, for example, a detailed road network comprising expressways, federal roads, major local roads, state roads, narrow streets, etc., each of which has a scope covering about 18 km square is stored.

The route search section 27, in the case that the distance to the destination is short, e.g., about 3 km, searches a route using only a block of the bottom layer in the vicinity of the current location, i.e., one block. When the distance to the destination is of an intermediate length, e.g., about 50 km, a route is searched by using blocks of the bottom layer in the vicinity of the current location and the destination, and a block of the middle layer which includes the area between the current location and the destination, i.e., three blocks in total. Further, the route search section 27, in the case that the distance to the destination is long, e.g., about 300 km, searches for a route by using blocks of the bottom and middle layers in the vicinity of the current location and the destination, and a block of the top layer which includes the area from the current location to the destination, i.e., five blocks in total. In the foregoing manner, the quantity of the road network data which is used for searching a route can be reduced, and the time required for the route search can be shortened.

The rapid road judgment section 28, when route search section 27 searches for a route, investigates the rapid road information which is included in the block(s) of road data searched, and judges whether or not the block(s) to be used for the search include(s) a "rapid road". As used herein, the term "rapid road" means a road which is easy to drive at a relatively high running speed, for example, a road of wide width having few intersections and traffic lights, and so on. The route search section 27 reduces the search cost attributed to a road which the rapid road judgment part 28 has judged to be a rapid road, and then searches the road database. On that account, in a case where a route which includes a rapid road has substantially the same "cost" as that of a route which does not include a rapid road, the route which includes the rapid road is preferentially selected.

As used herein, the term "search cost" means the weighting of a road for the route search, based on road classification, toll road/expressway, road length, road width, right and left turns, etc. For example, in case where the "search cost" is length of a road, the route having the shortest total of road length to the destination is selected for guidance, i.e., set as the "search route." In the case where the "search cost" is determined in accordance with travel time, that route for which the total travel time to the destination is shortest becomes the "search route" (or "guidance route").

Further, this embodiment is designed so that the rapid road information preparation section 29, in the case where rapid road information is not included in the road database, prepares the rapid road information. The rapid road information preparation section 29, in the case where the route search section 27 searches hierarchized road network data, prepares the rapid road information only for roads which are included in the block(s) to be used. The "rapid road" designation is, as shown in FIG. 18, stored in the road database as one of the road classifications. Accordingly, in a case of a block which was used in a previous search, since rapid road information is already included in the road data of that block, there is no need to prepare rapid road information for that block in a subsequent search.

In addition, with the search data in the form of a block unit, the rapid information preparation section 29, as shown in FIG. 21, judges whether or not there is rapid road information in the management information of the block to be used for the search. And, in the case where such data is present in the management information, the routine is terminated but in case that it is not present, the rapid road designation is given to a road which satisfies a formula which will be explained later, and data which shows that rapid road information is present is included in the management information of the block. In this manner, as route searching is repeated, the rapid road information is learned and the time necessary for the route search becomes progressively shorter.

In this embodiment, from a functional viewpoint, the in-vehicle apparatus 14 may include a memory storing road data comprising a plurality of links, a grouping unit for executing a grouping operation which integrates a plurality of links, a rapid road judgment unit for judging whether or not the grouped link satisfies conditions for a "rapid road" designation, and a preparation unit for preparing the rapid road information for a link judged to be a rapid road.

Next, operation of the above-described in-vehicle apparatus 14 will be described with reference to FIGS. 22–26.

Firstly, when an operator sets the destination, the route search section 27 starts a search for a route from the current location to the destination. Here, the route search section 27 is assumed to search for a route by using hierarchized road network data. And, in the case where the rapid road information has not been prepared for roads included in the data block that the route search section 27 uses, the rapid road information preparation section 29 prepares such rapid road information.

Figure 22:
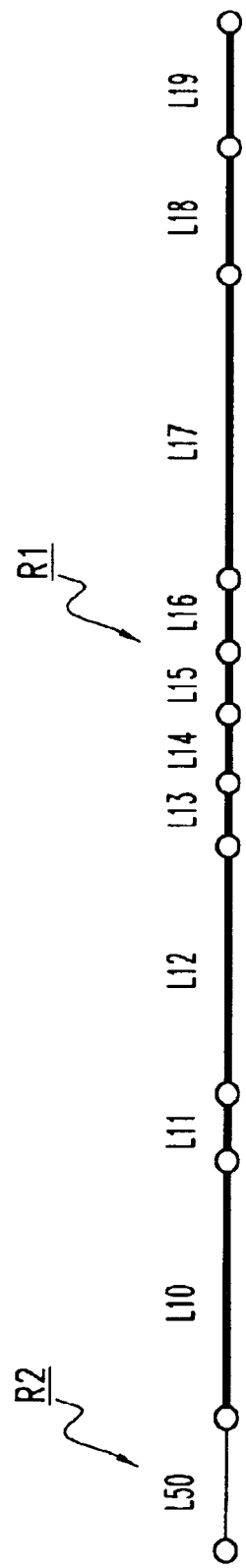
FIG. 22 is a diagram of a road as structured for preparing rapid road information in an embodiment of the invention.
Figure 25:
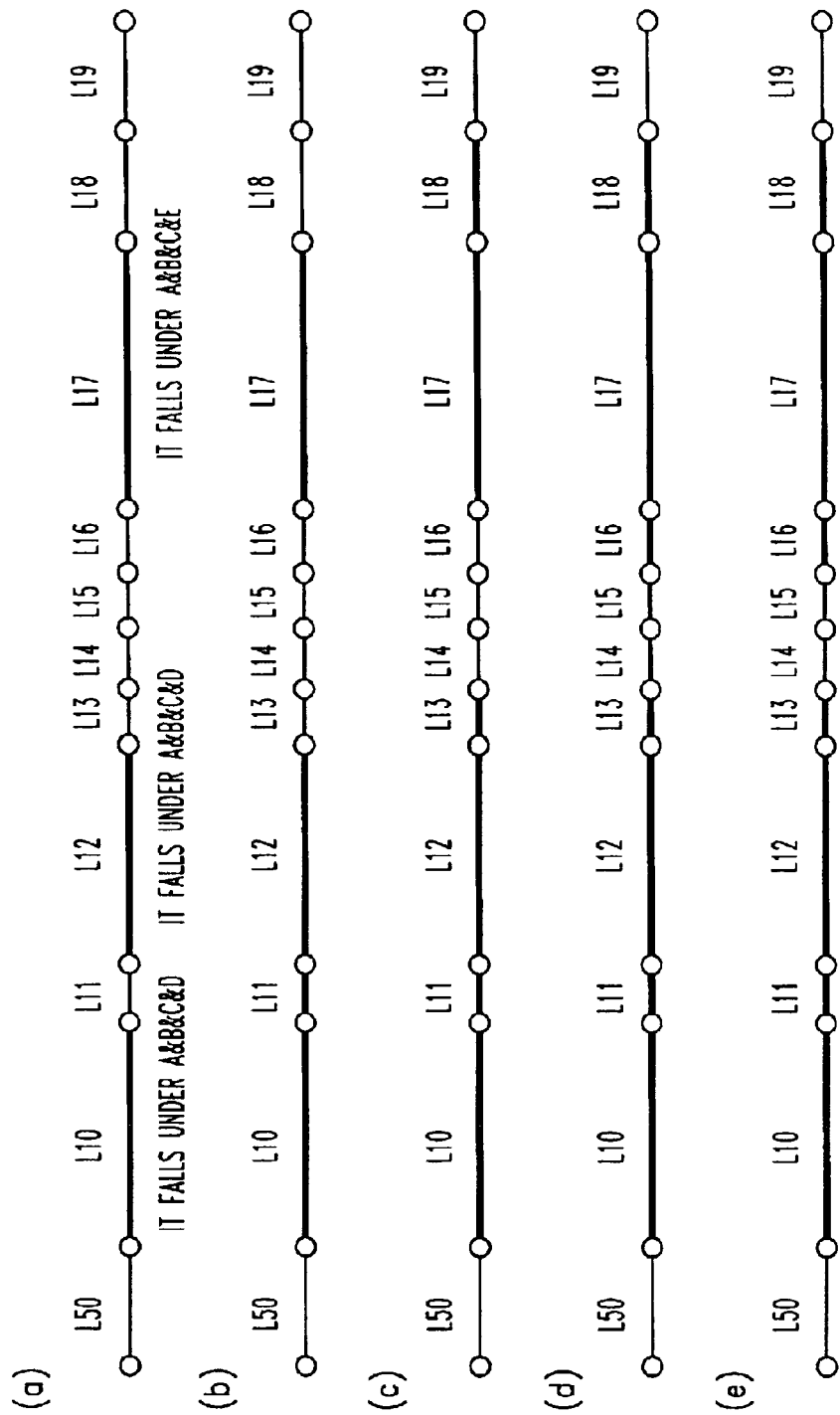
FIG. 25 is a diagram illustrating procedures for preparing the rapid road information in an embodiment of the invention.

The rapid road information preparation section 29 extracts a road R1 for preparing rapid road information as shown in FIG. 22. Here, road R1 is a continuous length of the same, identical road. In addition, in FIG. 22, a road R2 which is shown by a thin line forms another continuous road which is connected to the road R1. For example, if the road R1 is a state road and road R2 is a city road, and administration road attributes of the road R1 and the road R2 differ, in this embodiment, even if R1 and R2 together are continuous, they are treated as separate roads, not as one road.

The road R1 is, as shown in FIG. 22, divided into a plurality of links L10 to L19. In addition, L50 designates a link of the road R2. As used herein, the term "link" means one unit of plural units which comprise a road. A road is normally segmented into links by intersections where three or more roads intersect, regardless of whether or not the intersections include a traffic light. Accordingly, the number of links in one road will vary, but this embodiment utilizes an example, as shown in FIG. 22, in which a road is divided into ten links. In FIG. 22, a white circle represents a junction between links, e.g., an intersection. In addition, a junction (boundary) between L50 and L10 in FIG. 22, a point where the administration road attribute of a road changes, is also treated as a junction between links.

Subsequently, the rapid road information preparation section 29, for each of the links L10 to L19, checks whether or not the link satisfies conditions for designation (judgement) as a rapid road. Firstly, it is judged whether or not the links L10 to L19 satisfy basic conditions A to H as factors for ease of drive and travel speed, as shown in FIG. 23.

Here, condition A relates to the administration road attribute. Basic condition B relates to road length between traffic lights, and, for example, means that the road length between traffic lights or average road length between traffic lights, within a given zone, is more than a predetermined value. The basic condition C is satisfied where the road length between intersections or average road length between intersections in a given zone is more than a predetermined value.

In this embodiment, for example, the basic condition A is satisfied where the administration road attribute is a state road or higher rank, i.e., that it is a state road, a federal road, etc. This is because it is assumed that, if the road is a state road or above, the maintenance of the road is good and, therefore, is easy to drive at a high speed. Satisfaction of condition B means that the average road length between traffic lights is 1000 m or more. This is because it is assumed that, if the distance between traffic lights is more than some predetermined length, the road is easy to drive and the travel speed is higher. The basic condition B is judged by integrating all of the links which exist between traffic lights, and the result of the judgment is applied to all of the links. The basic condition C is satisfied when the average road length between intersections is 150 m or more. This is because it is assumed that, if the distance between intersections is more than some value, the road is easy to drive and travel speed is higher.

The basic condition D is satisfied where the opposing lanes are separated, or it is a single road with a median strip. This is because it is assumed that, if opposing lanes are separated from each other, the road is easy to drive and travel speed is high. Also, satisfaction of the basic condition E means that the average number of traffic lanes in one direction is 1.5 or more. This is because it is assumed that, if the number of lanes in one direction is 1.5 or more, i.e., 2 lanes or more in one direction, the road is easy to drive and travel speed is high.

Further, the basic condition F is satisfied by an elevated road which continues 2 km or more. This is because it is contemplated that, if the road is an elevated road, it is easy to drive and allows a high running speed. Also, satisfaction of the basic condition G means that there is no intersection between interchanges. This is because it is assumed that, if there is no intersection between interchanges, it is generally an elevated road and, therefore, it is easy to drive at a high speed. Also, satisfaction of the basic condition H means that only cars are allowed to use the road. This is because it is assumed that a car exclusive use road, such as an expressway, is easier to drive and at a high speed.

In addition, the basic conditions A to H which are used to designate a rapid road can be changed, deleted, and added as needed. For example, it is possible to add a ratio of time for a green signal ("go" signal) to time for a red signal ("stop" signal) for traffic lights to the basic condition B. This is because it is assumed that, if the ratio of time for the green signal to time for the red signal is more than some value, the road is easy to drive at a high running speed.

Subsequently, the rapid road information preparation section 29, judges whether or not each of the links L10 to L19 satisfies the following conditional formula (1) relating to the basic conditions A to H.

$$[F \text{ or } G \text{ or } H \text{ or } \{B \text{ and } (D \text{ or } E)\}] \text{ and } (A \text{ and } C) \quad \text{Conditional Formula (1)}$$

The Conditional Formula (1) can be broken down into the following conditional formulas (2) to (6).

| | |
|---|---|
| $A$ and $B$ and $C$ and $D$ | Conditional Formula (2) |
| $A$ and $B$ and $C$ and $E$ | Conditional Formula (3) |
| $A$ and $C$ and $F$ | Conditional Formula (4) |
| $A$ and $C$ and $G$ | Conditional Formula (5) |
| $A$ and $C$ and $H$ | Conditional Formula (6) |

Accordingly, if a link satisfies any one of the Conditional Formula (2) to (6), it is found to satisfy the judgement condition.

In addition, the above conditional formulas can be changed and deleted as needed. In this embodiment, for convenience of explanation, the basic conditions F to H are omitted, and a case in which, as a first condition, it is judged whether or not a link meets the basic conditions A to E, and as the second condition, it is judged whether or not the link satisfies the conditional formula (2) or (3). Results are shown in FIG. 24 wherein O means that the link satisfies the basic condition or the conditional formula, and X means that it does not.

When the links which meet the second condition are indicated by a heavy line, FIG. 25A is obtained. That is, the links L10, L12 and L17 meet the second condition.

The rapid road information preparation section 29 next executes a grouping operation for combining links. In a first grouping operation, among links on the same road which meet the second condition, neighboring links are combined as one group. In this case, by concurrently combining with a link which does not meet the second condition, one group is made. In the case shown in FIG. 25A, the link L10 and the link L12 are combined, and a link L11 which is located between them, but does not meet the second condition, is concurrently combined with them to make one group. Also, the link L12 and the link L17 are combined, and links L13 to L16 which are located between them but do not meet the second condition are concurrently combined with them to make one group. Considering the group as one link, it is judged whether or not the group meets the basic conditions A to E, and thereafter, it is judged whether or not the group satisfies the conditional formula (2) or (3).

When the group satisfies the second condition, hereinafter, it is treated as one link which satisfies the second condition. However, if the group does not satisfy the second condition, the group is broken down and put back for treatment as separate links.

The result of the first grouping operation is as shown in FIG. 25B. In this case, since the group in which the links L10 to L12 were combined satisfies the second condition, it is treated as one link which satisfies the second condition and is shown as a heavy line. Since the group in which the links L12 to L17 have been combined does not satisfy the second condition, it is put back as shown in FIG. 25B.

Next, the rapid road information preparation section 29 executes a second grouping operation. In this case, a link which meets the second condition and a link which is adjacent to that link and which does not meet the second condition are combined to make one group. Here, when one link satisfies the second condition but the links on both sides fail the second condition, the longer link which fails to meet the second condition is selected to be combined. In the case shown in FIG. 25B, the group of links L10 to L12 is combined with the link L13 to make one group. Also, the link L17 and the link L18 are combined to make one group. And, considering the group as one link, it is judged whether or not it meets the basic conditions A to E, and thereafter, it is judged whether or not it meets the conditional formula (2) or (3).

In other words, a group which meets the second condition, is thereafter treated as one link meeting the second condition. Also, in the case where the group does not satisfy the second condition, and the group is broken down and the resulting components are treated as separate links.

An example of the second grouping operation is shown in FIG. 25C. In this case, since the group in which the links L10 to L13 were combined and the group in which the links L17 and L18 were combined meet the second condition, it is treated as one link meeting the second condition and is indicated by a heavy line.

Subsequently, the rapid road information preparation section 29 executes the second grouping operation a second time. In the case shown in FIG. 25C, the group of the links L10 to L13 is combined with the link L14 to make one group. Also, the group of the links L17 and L18 is combined with the link L19 to make one group. And, considering the group as one link, it is judged whether or not it meets the basic conditions A to E, and thereafter, it is judged whether or not it satisfies the conditional formula (2) or (3).

And, as a result of repeating the second grouping operation a second time, since the group in which the links L10 to L14 were combined and the group in which the links L17 to L19 were combined do not meet the second condition, they are broken down back into the links from which they were formed.

Subsequently, the rapid road information preparation section 29 executes the second grouping operation a third time. In this case, based upon the result of the preceding second grouping operation, a link which falls under the second condition is combined with an adjacent link which does not meet the second condition but has not yet been subject to the second grouping operation. Because, within the group of links L10 to L13, there is no neighboring link which does not meet the second condition, other than the link L14, the links L10 to L13 are maintained as is. The link L16 is combined with the group of the link L17 and the link L18 to make one group and, treated as one link, is judged whether or not it meets the basic conditions A to E, and thereafter, it is judged whether or not it satisfies the conditional formula (2) or (3).

The result of the third execution of the second grouping operation is shown in FIG. 25(d). In this case, since the group in which the links L16 to L18 were combined meets the second condition, it is treated as one link meeting the second condition, and is shown as a heavy line.

While it is possible to arbitrarily set the number of times for carrying out the second grouping operation, in this embodiment it is executed three times.

Subsequently, the rapid road information preparation section 29, based upon the result of the third execution of the second grouping operation, designates all links which belong to a group which meets the second condition as rapid roads, and prepares the rapid road information. In addition, as to a link which belongs to a plurality of groups, it is treated as one which belongs to any one group. The result is as shown in FIG. 25E. In this case, the links L10 to L13 and the links L16 to L18 are judged to be rapid roads, and the links L14, L15 and L19 are judged not to be rapid roads. The results of the judgment are prepared as the rapid road information, and stored in the road classification section of the search data as shown in FIG. 18. In addition, in the case that the search data is as shown in FIG. 19, it is stored in the rapid road database.

The rapid road information preparation section 29, for all roads included in the block(s) subject to the route search, carries out the above-described operations, and prepares the rapid road information, and stores it in the road classification section of the search database. In the case of roads included in the blocks previously used for a route search, the rapid road information is included in the road data and there is no need to prepare rapid road information. Thus, all roads included in all blocks searched by the route search section 27 have rapid road information.

Next, the rapid road judgment section 28, for each road included in the blocks used by the route search section 27, investigates rapid road information included in the road data in the search database, and judges whether or not it is a rapid road.

The route search section 27 lowers the search cost for a rapid road, and then searches a route from the current location to the destination. In this manner, the route from the current location to the destination with the lowest search cost is selected as the optimum route or "search route". Finally, the optimum route from the current location to the destination is displayed on the screen of the display part 35 as the "search route" or "guidance" route.

Next, the flow chart for operation of this embodiment, shown in FIG. 26, will be described.

Step S1 The road R1 is extracted.

Step S2 It is judged whether or not each link or R1 meets the first condition.

Step S3 It is judged whether or not each link satisfies the second condition. Where a link does satisfy the second condition, the routine goes to Step S4, and in case that it does not, it goes to Step S5.

Step S4 The link is judged to be a rapid road.

Step S5 The first grouping operation is carried out.

Step S6 It is judged whether or not the group meets the second condition. When the group meets the second condition, the routine goes to Step S4, and when it does not, the routine goes to Step S7.

Step S7 The second grouping operation is carried out.

Step S8 It is judged whether or not the group meets the second condition. When the group meets the second condition, the routine goes to Step S4, and when it does not, the routine goes to Step S9.

Step S9 The link is judged not to be a rapid road.

Each step illustrated in the flow chart can be changed, deleted, and exchanged according to need. For example, Step S2 can be deleted, and the Step S7 and Step S8 can be deleted, and Step S5 can be exchanged with Step S7.

In this manner, when the route search section 27 searches for a route, the rapid road judgment section 28 judges whether or not it is a rapid road, based upon the rapid road information included in the road data in the search database. The route search section 27 lowers the search cost for a rapid road, and searches for a route having the minimum search cost.

In this manner, it is possible for the search to identify a route including the rapid road(s) which is easy to drive and can be driven at a high speed. Accordingly, the driver can drive safely and comfortably, and can also reach the destination within a shorter time.

The rapid road information identifying the rapid roads, as prepared by the rapid road information preparation section 29, is stored in the search database. Within the search database, a grouped link which satisfies the conditions for a rapid road is identified (designated) as a rapid road. Accordingly, the rapid road information properly reflects ease of driving and running speed for traveling a road. The rapid road information allows the time required for travel to the destination to be more precisely calculated.

Next, another embodiment will be described with reference to FIG. 27. Explanation of structural elements which are the same as in the above-described embodiment and operations will be omitted.

In FIG. 27, 40 designates an information center which function as a server, and which includes a calculation unit such as a CPU or MPU, a memory unit such as a semiconductor memory, or magnetic disc, and a computer having a communication interface, etc. In addition, the computer may be a so-called distributed server which is not a single computer, but rather a plurality of computers integrated organically. Further, other systems may be included in the information center 40.

The in-vehicle apparatus 14 which represents an apparatus in one vehicle is actually one of many, but in this embodiment, for convenience of explanation, only one in-vehicle apparatus 14 is shown. In addition, the in-vehicle apparatus 14 is similar to the in-vehicle apparatus 14 of the previously described embodiment but, in this embodiment, it may be one in which its functions are drastically reduced. For example, the in-vehicle apparatus here may simply have a calculation unit such as a CPU or MPU, a memory unit such as a semiconductor memory, or a magnetic disc, a display unit such as a liquid crystal display, an LED display, or CRT, an input unit such as a keyboard, a remote controller, or a touch panel and a communication interface. The in-vehicle apparatus 14 is, for example, a navigation apparatus which is mounted in/on a passenger car, a truck, a bus, a motorcycle, etc., but may be in the form of a portable telephone, a portable information terminal, a PDA (Personal Digital Assistance), a personal computer, a game machine, or a digital television.

Further, the in-vehicle apparatus 14, in case that it is a navigation apparatus, in the same manner as in the above-described embodiment, detects the current location by a current location detection processing section 15 but, for example, in case that it is a portable telephone, a portable information terminal etc., based upon communication with a base station which serves the portable phone, the portable information terminal, etc., can also detect the position of the base station as the current location.

Here, the information center 40 and the in-vehicle apparatus 14 are connected for communication through a network 57. The network 57 may be any wired or wireless public communication network, a private communication network, Internet, an intranet, LAN (Local Area Network), WAN (Wide Area Network), a satellite communication network, etc., or a combination thereof. Also, communication may be carried out by utilizing CS broadcasting and BS broadcasting by broadcasting satellites, by utilizing terrestrial wave digital television broadcasting, by utilizing FM multiple broadcasting, or by utilizing optical beacons and radio beacons which are disposed roadside.

Thus, the navigation system of this embodiment is composed of the information center (IC) 40 and the in-vehicle apparatus 14.

In addition, the information center 40 has an information providing section 44 for providing to the in-vehicle apparatus 14, information pertaining to a route to a destination, based upon departure place information and destination information received from the in-vehicle apparatus 14, etc. The IC 40 further includes a terminal information storing section 45 for storing the information with respect to each in-vehicle apparatus 14, and a terminal identification section 46 for identifying the in-vehicle apparatus 14 based upon an ID key, etc.

The information providing section 44 has a map database 47 as a map information memory unit, a POI(Point of Interest) database 48, a road database 49, a public transport database 50, a traffic information database 51, etc.

Here, the map database 47 stores map information such as nodes for drawing a map, links, coordinates, and facility names. Also, the POI database 48 stores facility data for searching for a location which becomes a place of departure, a destination, a point to be passed, rest stop, etc. Further, the road database 49 stores search data for searching for a route, including search cost, road classification, etc. The public transport database 50 stores data for trains, buses, airplanes, ships etc., parking lots, traveling time tables, etc. The traffic information database 51 (which in a road traffic information communication system is called a VICS), stores road traffic information relating to traffic jams on roads which is collected from traffic control systems of police departments, Japan Highway Public Corporation, etc.

In addition, a memory unit of the information center 40, in which the map database 47, the POI database 48, the road database 49, the public transport database 50, the traffic information database 51, etc., are stored, may be a memory medium internal to the information center 40, or may be an external memory medium. The internal memory medium or the external memory medium may be any kind of magnetic tape, magnetic disc, magnetic drum, CD-ROM, MD, DVD-ROM, optical disc, MO, IC card, optical card, memory card, etc.

The information providing section 44 has a map preparation section 52 for drawing a map based upon the map information, a POI search section 53 for searching for a location on the basis of coordinate information, names, addresses, etc., of specific locations such as the destination, based upon the information stored in the POI database 48, and a route search section 54 for searching for a route, from a current location to a destination, based upon information stored in the road database 49, the public transport database 50, the traffic information database 51, etc.

Further, the information providing section 44 has a transmission and reception section 56 for transmitting and receiving information to/from the in-vehicle apparatus 14, and a keyword extraction section 55 for a keyword search of the information received, for example, for a name of a location.

The information providing section 44 has a destination setup section, an arrival estimated time calculation section, a comparison unit, and a reply unit.

Here, the destination setup section is a unit for setup of a destination based upon position information when the position information such as a destination, or point to be passed, is received from the in-vehicle apparatus 14. The estimated arrival time calculation section is a unit for calculating the time of arrival at the destination, i.e., the arrival time estimated based upon information for the route which was determined by the route search section 54, for example, as the sum of required time data for each of cross-road zones. In addition, the arrival estimated time calculation section may be one which renews estimated time of arrival at a fixed time interval. The estimated arrival time may be renewed (re-calculated) with addition of latest traffic jam information, regulation information, etc., stored in the traffic information database 51.

The comparison unit compares the estimated time of arrival with a desired time of arrival which was extracted as a time keyword. The reply unit informs the in-vehicle apparatus 14 that the estimated time of arrival is later than the desired time of arrival, when the estimated time of arrival is found to be later than the desired arrival time by the comparison unit.

The in-vehicle apparatus 14, in the same manner as the in-vehicle apparatus 14 of the previously described embodiment, has a communication unit 38 and a display unit 35. Here, the display unit 35 displays a map received from the information center 40, and displays current location, destination, etc., of the in-vehicle apparatus 14 on the map. Further, it is designed to also display the desired arrival time, the estimated arrival time, name and address of the destination, etc.

Thus, the information center 40, upon receipt of the information of the current location and the destination from the in-vehicle apparatus 14, in the same manner as the method explained in connection with the previously described embodiment, investigates the rapid road information which is included in the road data in the search database, and judges whether a road which is included in a layer used for search is a rapid road. And, after lowering the search cost for the rapid road, a route from the current location to the destination is searched. Subsequently, information for the searched (designated) route is sent to the in-vehicle apparatus 14.

In this embodiment, since there is no need for the data recorder 16 in the in-vehicle apparatus 14 to have a database comprising a map data file, a road data file etc., it is possible to simplify the structure of the in-vehicle apparatus 14. Therefore, it becomes possible to miniaturize and reduce the weight of the in-vehicle apparatus 14, and also to lower manufacturing cost. Also, because the information center 40 frequently renews various data items, it is possible to obtain a result for the route search based upon the latest data.

In addition, when the in-vehicle apparatus 14 has a database comprising the map data file, the road data file, etc., for example, processing up to the setup of the destination, etc., is carried out in the in-vehicle apparatus 14, and the result of such processing is sent to the information center 40 for further processing in the information center 40. In this manner, the processing load on the information center 40 can be reduced, the structure of the information center 40 can be simplified, and operation cost can be lowered.

This invention is not limited to the foregoing embodiments, and many modifications are possible consistent with the spirit of the invention, and such modifications are intended to be included within the scope of the invention. For example, a computer, using search data, as shown in FIG. 18 or FIG. 19, but lacking the rapid road information, may prepare the rapid road information as described above, assemble the search data as shown in FIG. 18 and FIG. 19, and store it in a memory medium. The in-vehicle apparatus and the information center utilizing search data including the rapid road information as shown in FIG. 18 or FIG. 19, without the rapid road information preparation section 29 shown in FIG. 20, can search for the route with lowest search cost.

Alternatively, the in-vehicle apparatus and the information center may have search data lacking the rapid road information shown as a portion of the search data in FIG. 18 or FIG. 19 and, with a structure as shown in FIG. 20, can prepare the rapid road information as shown in FIG. 18 or FIG. 19, and search for a route based upon the rapid road information.

Figure 26:
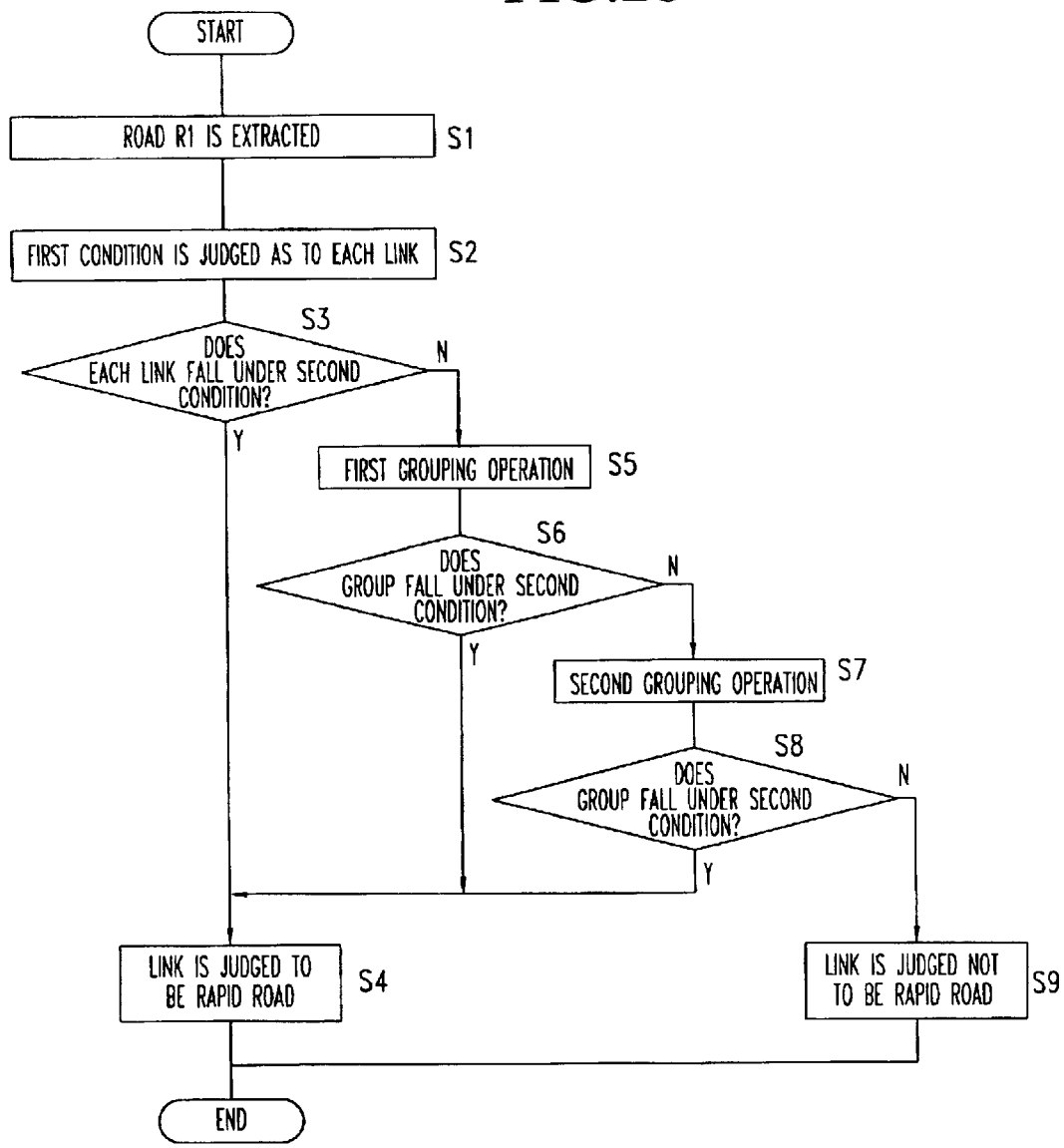
FIG. 26 is a flow chart of a routine for preparing the rapid road information in an embodiment of the invention.

Alternatively, the in-vehicle apparatus and the information center may have search data lacking the rapid road information from the search data as shown in FIG. 18 or FIG. 19, and, if equipped with a rapid road identifying section, can identify rapid roads in the manner shown in FIG. 26, and may search for a route by lowering the search cost of the rapid road. In this modified embodiment, the rapid road information is not prepared in advance.

All of the embodiments described above allow searching for a route while taking into account factors which influence ease in driving and running speed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The disclosure of Japanese Patent Application No. 2002-084184 filed on Mar. 25, 2002 and of Japanese Patent Application No. 2002-124357 filed Apr. 25, 2002, including the specifications, drawings and abstracts, are incorporated herein by reference in their entirety.

What is claimed is:

1. A navigation system comprising:
   an information retrieval unit for obtaining map data and data for interchanges for getting on and off expressways and toll roads;
   a display unit; and
   a setup screen display processing means for displaying, on the display unit, a map that includes interchanges for getting on and off as one area of a setup screen, and a simple road chart that shows neighboring interchanges for getting on and off side-by-side as another area of the same setup screen in the form of a block diagram, both of which are formed based upon the map data, and for, responsive to scrolling of the map, changing the simple road chart so as to correspond to the area to which the map is scrolled.

2. The navigation system as set forth in claim 1, wherein, when the simple road chart is scrolled, the setup screen display processing means renews the simple road chart and concurrently, renews the map so as to correspond to the simple road chart.

3. The navigation system as set forth in claim 2, wherein the setup screen display processing means displays interchanges for getting on and off which are the closest to the center position of the map, at a fixed place on the simple road chart.

4. The navigation system as set forth in claim 1 further comprising:
   input means for input of a destination;
   route search means for searching the map data to determine a route to the destination including an expressway or toll road and said interchanges; and
   wherein said map shows the determined route and said interchanges.

5. A navigation system comprising:
- an information retrieval unit for obtaining map data, service stop data, and data for interchanges for getting on and off expressways and toll roads;
- a display unit;
- a setup screen display processing means for displaying, on the display unit, a map that includes interchanges for getting on and off as one area of a setup screen, and a simple road chart that shows neighboring interchanges for getting on and off as another area of the same setup screen, both of which are formed based upon the map data, and for, responsive to scrolling of the map, changing the simple road chart so as to correspond to the area to which the map is scrolled; and
- a service stop setup processing unit adapted to set locations for service stops, based upon the service stop data, wherein the service stop setup processing unit forms a service stop setup screen on the display unit, and displays the simple road chart as a block diagram including one block identifying a facility set as a service stop and additional blocks identifying neighboring facilities, on the service stop setup screen.

6. The navigation system as set forth in claim 5, wherein the service stop setup processing unit renews the simple road chart so as to correspond to the map, when the map is scrolled.

7. The navigation system as set forth in claim 5, wherein, when the simple road chart is scrolled, the service stop setup processing unit renews the simple road chart and concurrently renews the map so as to correspond to the simple road chart.

8. The navigation system as set forth in claim 5, wherein the service stop setup processing unit has facility selection narrowing condition setup means unit for setting a facility narrowing condition for narrowing the selection of one or more service facilities.

9. The navigation system as set forth in claim 5 further comprising:
- input means for selecting a facility or a service stop, wherein said screen display processing means, responsive to the selection, changes said simple road chart to identify said one block as the selected facility.

10. A navigation system comprising:
- an information retrieval unit for obtaining map data and data for interchanges for getting on and off expressways and toll roads;
- a display unit; and
- a setup screen display processing means for displaying, on the display unit, a map that includes interchanges for getting on and off as one area of a setup screen, and a simple road chart that shows neighboring interchanges for getting on and off as another area of the same setup screen, both of which are formed based upon the map data, and for, responsive to scrolling of the map, changing the simple road chart so as to correspond to the area to which the map is scrolled, wherein said simple road chart includes at least one block diagram wherein one block identifies an interchange designated for getting on or off the expressway or toll road and additional blocks, displayed side-by-side with said one block, identify interchanges neighboring said designated interchange.

11. The navigation system according to claim 10 further comprising:
- input means for selecting an interchange displayed in said simple road chart, wherein said setup screen processing means, responsive to the selection, changes said one block to identify the selected interchange as the interchange designated for getting on or off the expressway or toll road.

12. The navigation system according to claim 11 wherein said input means includes scrolling means for scrolling the interchanges displayed in said one block diagram.

13. The navigation system as set forth in claim 10 wherein said single road chart further includes a second block diagram consisting of two blocks, one of said two blocks identifying an interchange for getting on said toll road or expressway and the other of said two blocks identifying an interchange for getting off of said toll road or expressway.

14. A navigation system comprising:
- an information retrieval unit for obtaining map data and data for interchanges for getting on and off expressways and toll roads;
- a display unit; and
- a setup screen display processing means for displaying, on the display unit, a map that includes interchanges for getting on and off as one area of a setup screen, and a simple road chart that shows neighboring interchanges for getting on and off as another area of the same setup screen, both of which are formed based upon the map data, and for, responsive to scrolling of the map, changing the simple road chart so as to correspond to the area to which the map is scrolled; and
- input means for selecting an interchange displayed in said simple road chart and wherein said screen display processing means, responsive to the selection, changes said simple road chart to identify the selected interchange as an interchange designated for getting on or off an expressway or toll road.

* * * * *